United States Patent
Balasubramanian et al.

(10) Patent No.: US 11,240,294 B2
(45) Date of Patent: Feb. 1, 2022

(54) SYSTEMS AND METHODS FOR SPIKE DETECTION AND LOAD BALANCING RESOURCE MANAGEMENT

(71) Applicant: Samsung Electronics Co., Ltd., Suwon-si (KR)

(72) Inventors: Venkatraman Balasubramanian, Tempe, AZ (US); Olufogorehan Adetayo Tunde-Onadele, Raleigh, NC (US); Zhengyu Yang, San Diego, CA (US); Ping Terence Wong, San Diego, CA (US); Nithya Ramakrishnan, San Diego, CA (US); T. David Evans, San Diego, CA (US); Clay Mayers, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/706,161

(22) Filed: Dec. 6, 2019

(65) Prior Publication Data

US 2021/0058453 A1 Feb. 25, 2021

Related U.S. Application Data

(60) Provisional application No. 62/913,536, filed on Oct. 10, 2019, provisional application No. 62/890,864, filed on Aug. 23, 2019.

(51) Int. Cl.
  *H04L 29/08* (2006.01)
  *H04L 12/861* (2013.01)
  *H04L 12/26* (2006.01)

(52) U.S. Cl.
  CPC .......... *H04L 67/1002* (2013.01); *H04L 43/08* (2013.01); *H04L 49/90* (2013.01); *H04L 67/32* (2013.01)

(58) Field of Classification Search
  CPC ... H04L 67/1002; H04L 47/125; H04W 28/08
  See application file for complete search history.

(56) References Cited

U.S. PATENT DOCUMENTS 5,592,672 A * 1/1997 Grewal ............... H04Q 3/0025
709/238
6,438,138 B1 8/2002 Kamiya
(Continued)

FOREIGN PATENT DOCUMENTS

| CN | 106254272 A | 12/2016 |
| JP | 6289631 | 2/2018 |
| WO | 2014050125 A1 | 4/2014 |

OTHER PUBLICATIONS snia.org, https://composter.com.ua/documents/SNIASSSI PCIe101WhitePaper1.12013.pdf, "PCIe SSD 101", Jan. 1, 2013, pp. 1-32.

(Continued)

*Primary Examiner* — Esther B. Henderson
(74) *Attorney, Agent, or Firm* — Lewis Roca Rothgerber Christie LLP

(57) ABSTRACT

A load balancing system includes: a centralized queue; a pool of resource nodes connected to the centralized queue; one or more processors; and memory coupled to the one or more processors and storing instructions that, when executed by the one or more processors, cause the one or more processors to: monitor a queue status of the centralized queue to identify a bursty traffic period; calculate an index value for a load associated with the bursty traffic period; select a load balancing strategy based on the index value; distribute the load to the pool of resource nodes based on the load balancing strategy; observe a state of the pool of resource nodes in response to the load balancing strategy;

(Continued)

calculate a reward based on the observed state; and adjust the load balancing strategy based on the reward.

20 Claims, 21 Drawing Sheets

(56) References Cited

U.S. PATENT DOCUMENTS

| | | | |
|---|---|---|---|
| 6,683,875 B1 | 1/2004 | Byham et al. | |
| 6,986,139 B1* | 1/2006 | Kubo | G06F 9/505 709/223 |
| 7,289,498 B2* | 10/2007 | Yu | H04L 45/7453 370/389 |
| 7,448,044 B1 | 11/2008 | Rust et al. | |
| 8,031,729 B2 | 10/2011 | Elzur | |
| 8,589,941 B2 | 11/2013 | Cardona et al. | |
| 8,638,664 B2 | 1/2014 | Shankar et al. | |
| 8,640,128 B2 | 1/2014 | Cardona et al. | |
| 9,021,138 B2 | 4/2015 | Dabagh et al. | |
| 9,152,448 B2 | 10/2015 | Wang et al. | |
| 9,459,904 B2 | 10/2016 | Mehta et al. | |
| 9,571,426 B2 | 2/2017 | Agarwal et al. | |
| 9,785,356 B2 | 10/2017 | Huang | |
| 9,800,523 B2 | 10/2017 | Guan et al. | |
| 9,804,780 B2 | 10/2017 | Oe et al. | |
| 9,979,678 B2 | 5/2018 | Huang et al. | |
| 10,069,903 B2 | 9/2018 | Sorenson, III et al. | |
| 10,089,144 B1* | 10/2018 | Nagpal | G06F 9/5027 |
| 10,127,177 B2 | 11/2018 | Tamir et al. | |
| 10,142,231 B2 | 11/2018 | Vasudevan | |
| 10,637,917 B2* | 4/2020 | Mallick | H04L 67/1025 |
| 10,671,302 B1 | 6/2020 | Aggarwal et al. | |
| 10,757,180 B2* | 8/2020 | Hodges | H04L 67/1023 |
| 2002/0124104 A1* | 9/2002 | Rappaport | H04L 47/34 709/238 |
| 2003/0076849 A1 | 4/2003 | Morgan et al. | |
| 2005/0138170 A1* | 6/2005 | Cherkasova | H04L 41/145 709/225 |
| 2006/0064497 A1* | 3/2006 | Bejerano | H04W 48/20 709/228 |
| 2006/0161924 A1* | 7/2006 | Di Gregorio | G06F 9/3851 718/107 |
| 2008/0216087 A1* | 9/2008 | Dillenberger | G06F 9/505 718/105 |
| 2009/0161684 A1 | 6/2009 | Voruganti et al. | |
| 2010/0157964 A1 | 6/2010 | Yoon | |
| 2011/0044338 A1 | 2/2011 | Stahl et al. | |
| 2011/0142064 A1 | 6/2011 | Dubal et al. | |
| 2011/0153935 A1 | 6/2011 | Li | |
| 2011/0191011 A1 | 8/2011 | McBride et al. | |
| 2012/0072627 A1 | 3/2012 | Droux et al. | |
| 2012/0079495 A1 | 3/2012 | Conti et al. | |
| 2014/0274011 A1 | 9/2014 | Jain et al. | |
| 2014/0325524 A1 | 10/2014 | Zangaro et al. | |
| 2014/0337540 A1 | 11/2014 | Johnson et al. | |
| 2015/0233983 A1 | 8/2015 | Siebel et al. | |
| 2016/0301610 A1 | 10/2016 | Amit et al. | |
| 2017/0031610 A1 | 2/2017 | Regester et al. | |
| 2017/0083252 A1 | 3/2017 | Singh et al. | |
| 2017/0168715 A1 | 6/2017 | Eshwarappa et al. | |
| 2017/0315840 A1 | 11/2017 | Yu et al. | |
| 2018/0191867 A1 | 7/2018 | Siebel et al. | |
| 2018/0285021 A1 | 10/2018 | Akaike et al. | |
| 2018/0349026 A1 | 12/2018 | Richter et al. | |
| 2018/0349300 A1 | 12/2018 | Bubb et al. | |
| 2018/0359318 A1 | 12/2018 | Rogers et al. | |
| 2019/0042326 A1 | 2/2019 | Chilikin et al. | |
| 2019/0042331 A1 | 2/2019 | McDonnell et al. | |
| 2019/0042388 A1 | 2/2019 | Wang et al. | |
| 2019/0095491 A1 | 3/2019 | Bhattacharjee et al. | |
| 2019/0163764 A1 | 5/2019 | Ioannou et al. | |
| 2019/0182316 A1* | 6/2019 | Hodges | H04L 67/1023 |
| 2019/0196969 A1 | 6/2019 | Yang et al. | |
| 2019/0354406 A1 | 11/2019 | Ganguli et al. | |
| 2020/0162385 A1* | 5/2020 | Thiagarajan | H04L 43/0876 |

OTHER PUBLICATIONS

Mohammad Hedayati, et al., "Multi-Queue Fair Queuing", Department of Computer Science, University of Rochester Google Inc Technical Report #1005, Oct. 1, 2018, pp. 1-13, https://pdfs.semanticscholar.org/abd0/a302926f66268541a3cbb392b79fde7b4ecf.pdf.

Ann Klimovic, et al., "ReFlex: Remote Flash ≈ Local Flash", ASPLOS '17, Apr. 8-12, 2017, Xi'an, China Jul. 12, 2017, pp. 1-15, http://web.stanford.edu/group/mast/cgibin/drupal/system/files/reflex_asplos17.pdf.

John Kim, et al. "How Ethernet RDMA Protocols iWARP and RoCE Support NVMe over Fabrics", https://www.snia.org/forums/nsf/knowledge/webcasts, Jan. 26, 2016, pp. 1-34.

Wenyu Gao, Jianxin Wang, Jianer Chen and Songqiao Chen, "PFED: a prediction-based fair active queue management algorithm," 2005 International Conference on Parallel Processing (ICPP'05), Oslo, Norway, 2005, pp. 485-491, doi: 10.1109/ICPP.2005.63 ( Year: 2005).

Allen B. Downey, "Using Queue Time Predictions for Processor Allocation", EECS Department University of California, Berkeley, Technical Report No. UCB/CSD-97-929 (Year: 1997).

Guan, L. Awan, I.U. , 1Phillips, L. , Grigg, A. , Dargie, W. (2009). "Performance analysis of a threshold-based discrete-time queue using maximum entropy". Simulation Modelling Practice and Theory. 17, 558-568 (Year: 2009).

Hu, Q., Sun, Y. & Han, J. An efficient scheduling algorithm for input-queued switches. J. of Electron.(China) 24, 251-256 (2007). https://doi .org/10.1007/s11767-006-0111-8 (Year. 2007).

Yuan Sun, Qingsheng Hu, Jiangtao Han and Zhigong Wang, "A self-adaptive threshold based scheduling algorithm for input-queued switches," 2006 Workshop on High Performance Switching and Routing, Poznan, 2006, pp. 4 pp.-, doi: 10.1109/ H PSR.2006. 17097 41. (Year: 2006).

A. K. Choudhury and E. L. Hahne, "Dynamic queue length thresholds for shared-memory packet switches," in IEEE/ACM Transactions on Networking, vol. 6, No. 2, pp. 130-140, Apr. 1998, doi: 10.1109/90.664262. (Year: 1998).

H. Li and T. Yang, "Queues with a variable number of servers," European Journal of Operational Research, vol. 124, No. 3, pp. 615-628, 2000. (Year: 2000).

H. Xiao and G. Zhang, "The queuing theory application in bank service optimization," 2010 International Conference on Logistics Systems and Intelligent Management (ICLSIM), Harbin, 2010, pp. 1097-1100, doi: 10.1109/ICLSIM.2010.5461127. (Year: 2010).

U.S. Office Action dated Jul. 28, 2020, issued in U.S. Appl. No. 16/536,928, 26 pages, citing all the references listed above.

U.S. Office Action dated Oct. 27, 2020, issued in U.S. Appl. No. 16/459,166 (10 pages).

U.S. Final Office Action dated Nov. 13, 2020, issued in U.S. Appl. No. 16/536,928 (27 pages).

U.S. Advisory Action dated Feb. 8, 2021, issued in U.S. Appl. No. 16/536,928 (6 pages).

U.S. Chase, D.C. Anderson, P.N. Thakar, A.M. Vahdat, R.P. Doyle, Managing energy and server resources in hosting centers, in: Proceedings of the 18th ACM Symposium on Operating Systems Principles, ACM, New York, NY, USA, 2001, pp. 103-116 (Year: 2001).

M. Mazzucco, D. Dyachuk and M. Dikaiakos, "Profit-Aware Server Allocation for Green Internet Services," 2010 IEEE International Symposium on Modeling, Analysis and Simulation of Computer and Telecommunication Systems, Miami Beach, FL, USA, 2010, pp . 277-284, doi: 10.1109/MASCOTS.2010.36. (Year: 2010).

U.S. Office Action dated Mar. 2, 2021, issued in U.S. Appl. No. 16/536,928, citing references listed above (30 pages).

* cited by examiner

```
Procedure Dispatcher()
    receiveRequest(request)
    mnt=QueueLoadMonitor()
    det=WorkloadSpikeDetector()
    bal=LoadBalancer()
    while(result):
        if mnt.getQPNum()==1:
            strategy=sendAllToOneQP
        else:
            if(curTime mod strategyUpdateWindow == 0):
                spikeDeg=det.getCurSpikeDeg()
                if(spikeDeg==highSpike):
                    strategy==roundRobin
                else if(spikeDeg==midSpike):
                    strategy=JSQ
                else if(spikeDeg==lowSpike):
                    strategy=minCV
        bal.dispatch(request,strategy)
```

FIG. 5B

```
Procedure LoadBalancer(request,strategy):
    if(strategy==sendAllToOneQP):
        q=getQueuePair()
        send(request,q)
        return
    if(strategy==roundRobin):
        q=getQueuePairRoundRobin(lastQueueID)
        send(request,q)
        return
    if(curTime mod queueStatusUpdateWindow == 0):
        queueStatus=mnt.getQueueStatus()
    if(strategy==JSQ):
        q=getQueuePairJSQ(queueStatus.actualWorkloadAmount)
        send(request,q)
        return
    else if(strategy==minCV)
        q=getQueuePairMinCV(queueStatus.actualWorkloadAmount)
        send(request,q)
        return
```

FIG. 7B

```
Class SpikeDetector:
    ...
    # Function agent's overall schedule
    Procedure runDetectionSchedule():
        # Step 1: Initialize
        this.stoppingTime = nextStateTime()

# Step 2: While within time step
        while(currentTime()> this.prevStoppingTime) && (currentTime()< this.stoppingTime):
            ###################################################
            # Step 3: Compute new GI value
            this.currentGIValue = IndexPolicyFilter.getcurrentGI()
            ###################################################
            # Step 4: Sort k largest GI values
            GIStore.append(this.currentGIValue)
            sort(this.GIStore)
            trim(this.GIStore, k)
            this.kthGIValue = this.GIStore[k]

# Step 5: New kth largest value?
            if(this.currentGIValue == this.kthGIValue)
                return

# Step 6: Signal burst depending on threshold
            if(this.currentGIValue == IndexPolicyFilter.getburstGI)
                burstSignal = True
            ###################################################
    ...
    return
```

FIG. 10B

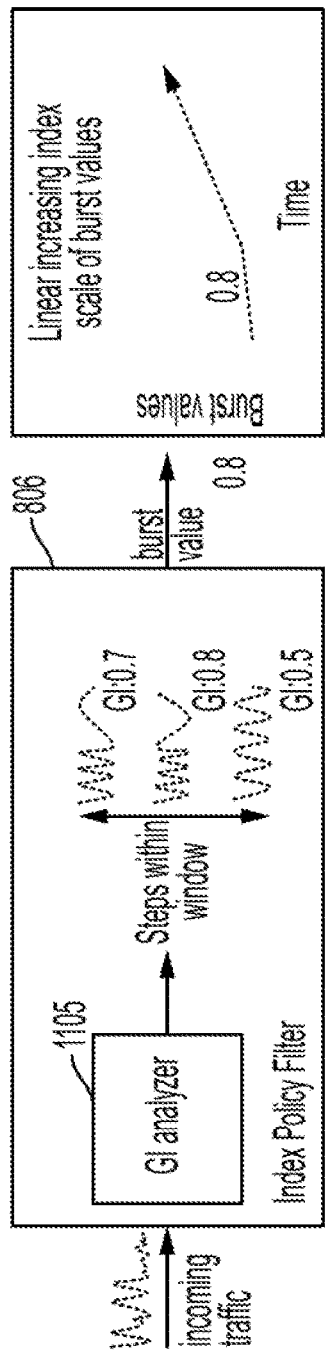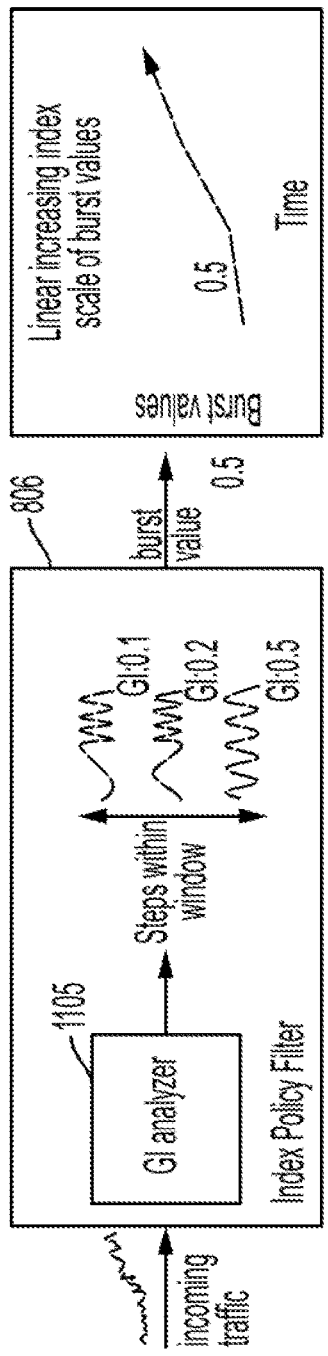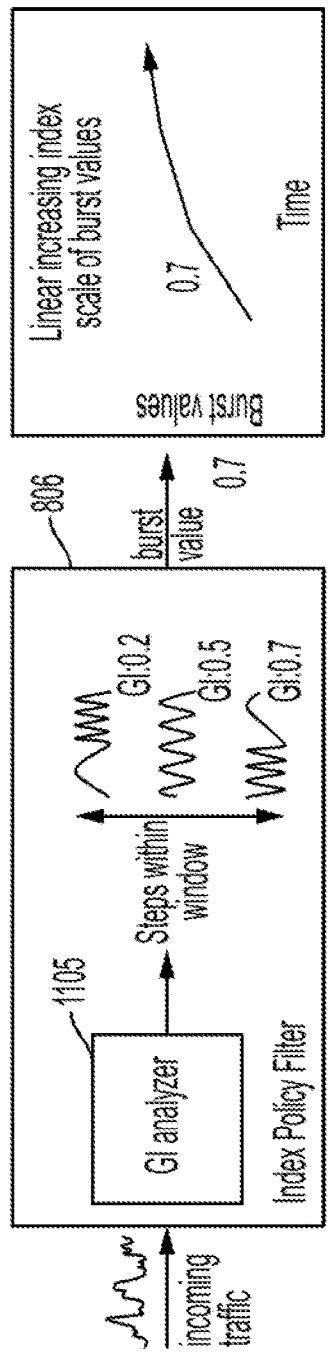
FIG. 11A
FIG. 11B
FIG. 11C

```
class QLearningAgent:
    ...
    # Function C
    Procedure play_and_train(env, agent, t_max=10**4):
        # This function should
        # run a full environment, actions given by the agent's e-greedy policy
        # train agent using agent.update(...) whenever it is possible
        # return total reward
        if this.strategy.incrementLoad("B_j_update"):
        ################################################
        # [Task]: Directly use (1-to-1 mapping);
        # Step: 1 Set NOT_FRAGMENTED_RANGE flag to True
        rewards.append(play_and_train(env, agent))
        agent.epsilon *= 0.99

# Binarized state spaces
        ##
        # This environment has a continuous set of possible states, so you will have to group them into bins
        somehow.
        # The simplest way is to use `round(x, n_digits)` (or numpy.round) to round real number to a given
        amount of digits.

n_actions = env.action_space.n
        print("first state:%s" % (env.reset()))
        ################################################
        ...
        return
```

FIG. 13B

SYSTEMS AND METHODS FOR SPIKE DETECTION AND LOAD BALANCING RESOURCE MANAGEMENT

CROSS-REFERENCE TO RELATED APPLICATION(S)

This application claims priority to and the benefit of U.S. Provisional Application No. 62/913,536, filed on Oct. 10, 2019, entitled "SPIKE DETECTION AND LOAD BALANCING RESOURCE MANAGEMENT IN CLOUD COMPUTING," and also claims priority and the benefit of U.S. Provisional Application No. 62/890,864, filed on Aug. 23, 2019, entitled "SPIKE DETECTION AND LOAD BALANCING RESOURCE MANAGEMENT IN CLOUD COMPUTING," the content of both of which are incorporated herein by reference in their entirety. This application is also related to U.S. patent application Ser. No. 16/536,928, filed on Aug. 9, 2019, and U.S. patent application Ser. No. 16/459,166, filed on Jul. 1, 2019, the content of both of which are incorporated herein by reference in their entirety.

FIELD

One or more aspects of example embodiments relate to workload traffic distribution, and more particularly to systems and methods for spike detection and load balancing.

BACKGROUND

Generally, the amount of traffic (or load) targeted towards cloud data centers fluctuate based on user requests. This traffic may be bursty (e.g., sudden peak in requests) and may require a high degree of resource reallocation. Often, however, the nature of uncertain workload traffic my require many requests to be reallocated on-the-fly, which may result in performance degradation. For example, traffic arriving at a cloud data center may be proportional to scheduling delays, where the higher the variability the longer the scheduling delays. Thus, if resources are committed, changing schedules may result in unsatisfied Service-Level Agreements (SLA).

These issues may be exacerbated for users who rent or own multiple server nodes (e.g., Docker containers, virtual machines, and the like) to process (or execute) requests. For example, these server nodes are generally hosted by a cloud computing vendor, and may be located on physical servers that often host other users' service nodes. Moreover, these physical servers are oftentimes oversold to multiple users, such that multiple users share the overpromised resource. As a result, a user having a workload spike (e.g., sending a large amount of jobs or requests) may not only cause issues for the user on the shared resource, but may also slow down the physical host server to affect other users.

Accordingly, systems and methods for spike detection and intelligent load balancing may be desired.

The above information disclosed in this Background section is for enhancement of understanding of the background of the present disclosure, and therefore, it may contain information that does not constitute prior art.

SUMMARY

According to one or more example embodiments, a load balancing system, includes: a centralized queue; a pool of resource nodes connected to the centralized queue; one or more processors; and memory connected to the one or more processors and storing instructions that, when executed by the one or more processors, cause the one or more processors to: monitor a queue status of the centralized queue to identify a bursty traffic period; calculate an index value for a load associated with the bursty traffic period; select a load balancing strategy based on the index value; distribute the load to the pool of resource nodes based on the load balancing strategy; observe a state of the pool of resource nodes in response to the load balancing strategy; calculate a reward based on the observed state; and adjust the load balancing strategy based on the reward.

In one or more example embodiments, the index value may correspond to a Gittins Index (GI) value.

In one or more example embodiments, to calculate the index value, the instructions may further cause the one or more processors to: calculate a plurality of GI values for the load associated with the bursty traffic period; and output a greatest one of the plurality of GI values as a new spike value.

In one or more example embodiments, to distribute the load to the pool of resource nodes, the instructions may further cause the one or more processors to: adjust resource requirements for the pool of resource nodes based on the new spike value to generate a new compute environment; and generate a schedule of job request distributions associated with the load for the new compute environment.

In one or more example embodiments, to select the load balancing strategy, the instructions may further cause the one or more processors to: calculate an incremental load managing value for each resource in the pool of resource nodes; and calculate a base resource parameter for each resource in the pool of resource nodes.

In one or more example embodiments, the load balancing strategy may be selected based on the resource with the greatest base resource parameter.

In one or more example embodiments, to calculate the reward, the instructions may further cause the one or more processors to: calculate a Q-function based on the index value, an input state, the selected load balancing strategy, and a reward function.

In one or more example embodiments, the Q-function may be calculated according to: $\hat{Q}(s,a) := r(s,a) + \gamma \max_{a_i} Q(s', a_i)$, wherein: s and s' may correspond to past and present state GI index values, respectively, a may correspond to different load values; and r may correspond to an immediate reward parameter.

In one or more example embodiments, the instructions may further cause the one or more processors to: apply an exponentially weighted moving average to the Q-function calculation.

In one or more example embodiments, the load may correspond to a Poisson traffic distribution.

According to one or more example embodiments, a method for load balancing, includes: monitoring, by one or more processors, a queue status of a centralized queue to identify a bursty traffic period; calculating, by the one or more processors, an index value for a load associated with the bursty traffic period; selecting, by the one or more processors, a load balancing strategy based on the index value; distributing, by the one or more processors, the load to a pool of resource nodes based on the load balancing strategy; observing, by the one or more processors, a state of the pool of resource nodes in response to the load balancing strategy; calculating, by the one or more processors, a reward based on the observed state; and adjusting, by the one or more processors, the load balancing strategy based on the reward.

In one or more example embodiments, the index value may correspond to a Gittins Index (GI) value.

In one or more example embodiments, the calculating of the index value may include: calculating, by the one or more processors, a plurality of GI values for the load associated with the bursty traffic period; and outputting, by the one or more processors, a greatest one of the plurality of GI values as a new spike value.

In one or more example embodiments, the distributing of the load to the pool of resource nodes may include: adjusting, by the one or more processors, resource requirements for the pool of resource nodes based on the new spike value to generate a new compute environment; and generating, by the one or more processors, a schedule of job request distributions associated with the load for the new compute environment.

In one or more example embodiments, the selecting of the load balancing strategy may include: calculating, by the one or more processors, an incremental load managing value for each resource in the pool of resource nodes; and calculating, by the one or more processors, a base resource parameter for each resource in the pool of resource nodes.

In one or more example embodiments, the load balancing strategy may be selected based on the resource with the greatest base resource parameter.

In one or more example embodiments, the calculating of the reward may include: calculating, by the one or more processors, a Q-function based on the index value, an input state, the selected load balancing strategy, and a reward function.

In one or more example embodiments, the Q-function may be calculated according to: $\hat{Q}(s,a):=r(s,a)+\gamma \max_{a_i} Q(s', a_i)$, wherein: s and s' may correspond to past and present state GI index values, respectively, a may correspond to different load values; and r may correspond to an immediate reward parameter.

In one or more example embodiments, the method may further include: applying, by the one or more processors, an exponentially weighted moving average to the Q-function calculation.

In one or more example embodiments, the load may correspond to a Poisson traffic distribution.

BRIEF DESCRIPTION OF THE DRAWINGS

The above and other aspects and features of the present invention will become more apparent to those skilled in the art from the following detailed description of the example embodiments with reference to the accompanying drawings.

FIG. 5B illustrates corresponding pseudocode for implementing the method of FIG. 5A.

FIG. 7B illustrates example pseudocode for implementing the various load balancing strategies of FIG. 7A, according to an example embodiment.

FIG. 10B is a corresponding pseudocode of the spike detection method of FIG. 10A.

FIGS. 11A-11C illustrate examples of an index policy filter for analyzing incoming traffic, according to example embodiments.

FIG. 13B is corresponding pseudocode for implementing the process of FIG. 13A.

DETAILED DESCRIPTION

Figure 1:
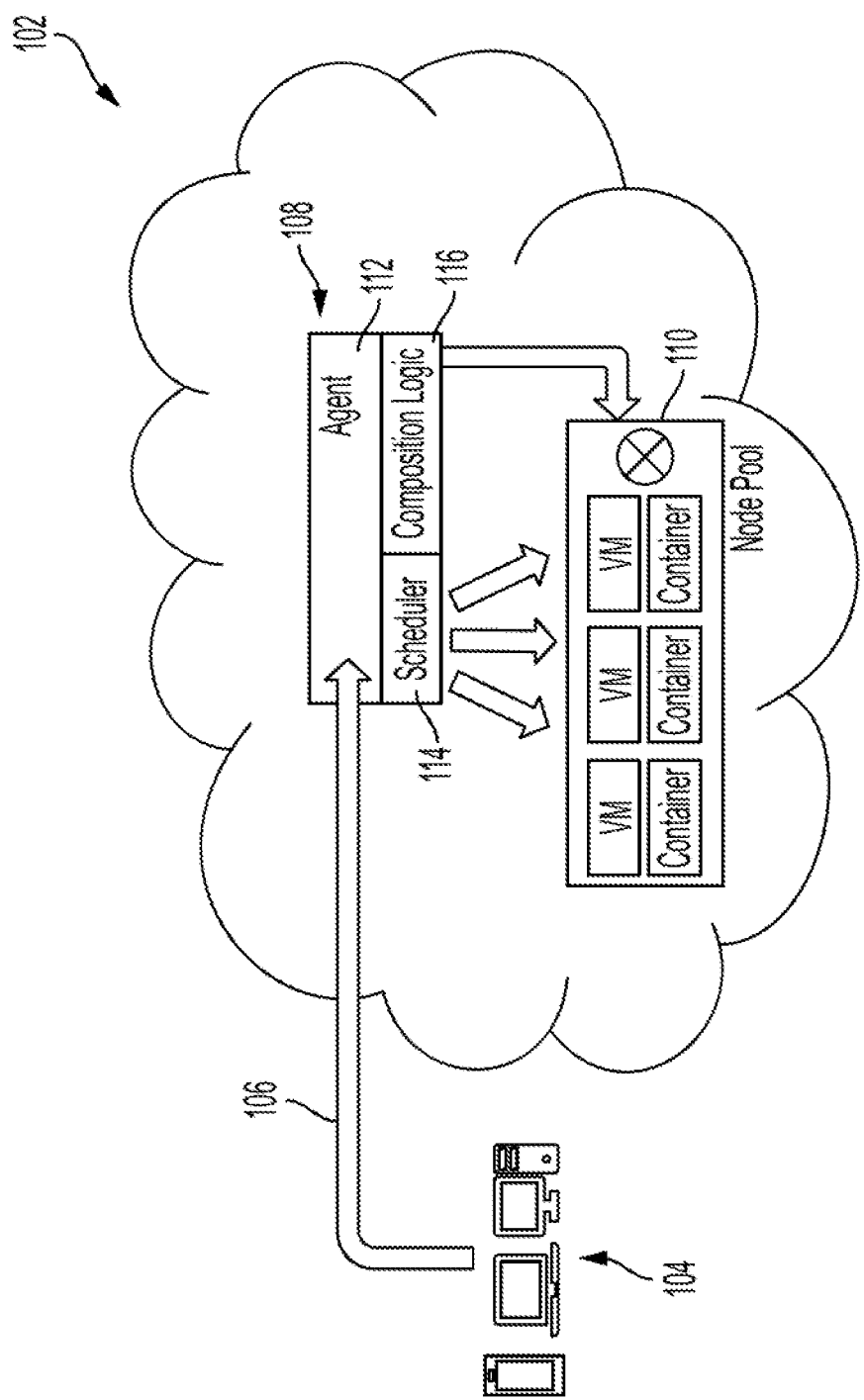
FIG. 1 illustrates a load balancing system in a cloud environment, according to an example embodiment.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

One or more aspects and features of example embodiments of the present disclosure are directed to an end-to-end solution to detect workload traffic spikes (also referred to as spike detection) and to conduct intelligent load balancing across server nodes. In some embodiments, a load balancing system is provided to detect workload traffic spikes and to select one or more resources to assign new jobs for a client.

In some embodiments, the load balancing system may be aware of other users' behavior impacts on the shared hosting physical servers (e.g., through periodic monitoring of the service rate of its own server nodes). In some embodiments, the load balancing system may selectively operate under two modes: (1) a first mode, which may be a heuristic mode; and (2) a second mode, which may be a machine learning mode such as, for example, a Reinforcement Learning-Based Mode.

In brief overview, the first mode (e.g., the heuristic mode) is a relatively lightweight approach that handles uniform distribution incoming workloads. Under the first mode, spikes may be detected using a squared-coefficient of variation-autocorrelation (SCV-ACF) method, which is based on the dispersion of a stochastic process. Job requests may then be allocated using a Round Robin load balancing strategy, a Join Shortest Queue load balancing strategy, and a minCV (minimum Coefficient of Variation) load balancing strategy in response to high, middle, and low spike degrees (or spike ranges), respectively.

The second mode (e.g., the learning mode) is a machine learning mode based on a reinforcement learning-based approach (e.g., Q-learning) that uses an index (e.g., Gittins Index) to predict a spike value (or spike level) within a specified job completion time. Under the second mode, the load balancing system may be enabled to respond to a broad spectrum of spike values (or spike levels), when compared to the first mode in which the spike ranges are divided into predetermined (or preset) categories. In some embodiments, under the second mode, the load balancing system may adjust the load balancing strategies based on changing workload conditions over time, may be enabled to support critical or time-sensitive jobs that have an expire due time, and may support dynamic resource allocation (e.g., adding or removing resources) in response to bursty traffic periods (e.g., high traffic spike periods).

In various embodiments, the load balancing system may be configured to operate under any one of the first mode or the second mode based on various desired aspects and features of the modes. In some embodiments, the load balancing system may include a mode selector to automatically select between the modes as desired or needed based on the workload conditions of the resource node pool.

Detecting and handling bursty requests (e.g., traffic spikes) is a complex issue faced in many areas. The difficulty may lie in analyzing spikes within changing local and global environments. The widespread cloud computing market is an area where this issue is commonplace. Accordingly, while various embodiments are described herein within the context of a cloud environment in which the load balancing system assigns job requests to computer (or server) nodes, the present disclosure is not limited thereto, and it is to be understood that the same or equivalent functions and structures may be accomplished by different embodiments and in different environments (e.g., distributed processing environment in which compute tasks are assigned to worker nodes, disk input/output processing in which I/O requests are assigned to disk resources, or the like) that are also intended to be encompassed within the spirit and scope of the present disclosure.

FIG. 1 illustrates a load balancing system in a cloud environment, according to an example embodiment. As shown in FIG. 1, the cloud environment 102 may be communicably connected to one or more customer devices (or client devices) 104 to process requests (or jobs) 106 from the customer devices 104. In some embodiments, the cloud environment 102 may include a load balancing system 108 connected to a resource node pool 110 to distribute the job requests to the resource node pool 110 according to various load balancing strategies. In some embodiments, the resource node pool 110 may include a plurality of resource nodes (e.g., server nodes), which is shown in the example of FIG. 1 as a plurality of virtual machines (VM) and corresponding containers (e.g., data containers). However, the present disclosure is not limited thereto, and in other embodiments, the resource node pool 110 may include a plurality of worker nodes, a plurality of disk drives (e.g., storage resource), and/or a plurality of processors (e.g., computational resource).

In a cloud environment, efficient allocation of resources to serve requests start at the clients' side. Client applications demand resources differently, such that if a particular client application is in higher demand, computation resources should be re-assigned to that client application. For example, applications having different execution requirements (such as serialized loadable library or parallel process) frequently demand resource reallocation. These requests, often incoming in short periods, are responsible for the spikes with higher rates of arrival. However, changing bursty workloads may degrade quality of service (QoS), and may affect service provider profit. Therefore, the job arrival and completion rate of the workload may need to be optimally considered without dropping requests.

In some embodiments, the load balancing system 108 may include a load balancing agent 112, a resource pool scheduler 114, and composition logic 116. As will be discussed in more detail below, in various embodiments, the load balancing agent 112 may distribute the load (e.g., job requests) to the resource nodes in response to spikey arrival periods. In some embodiments, the load balancing system 108 may operate under a first mode or a second mode as needed or desired to balance the load, in response to changing workload conditions.

Figure 2:
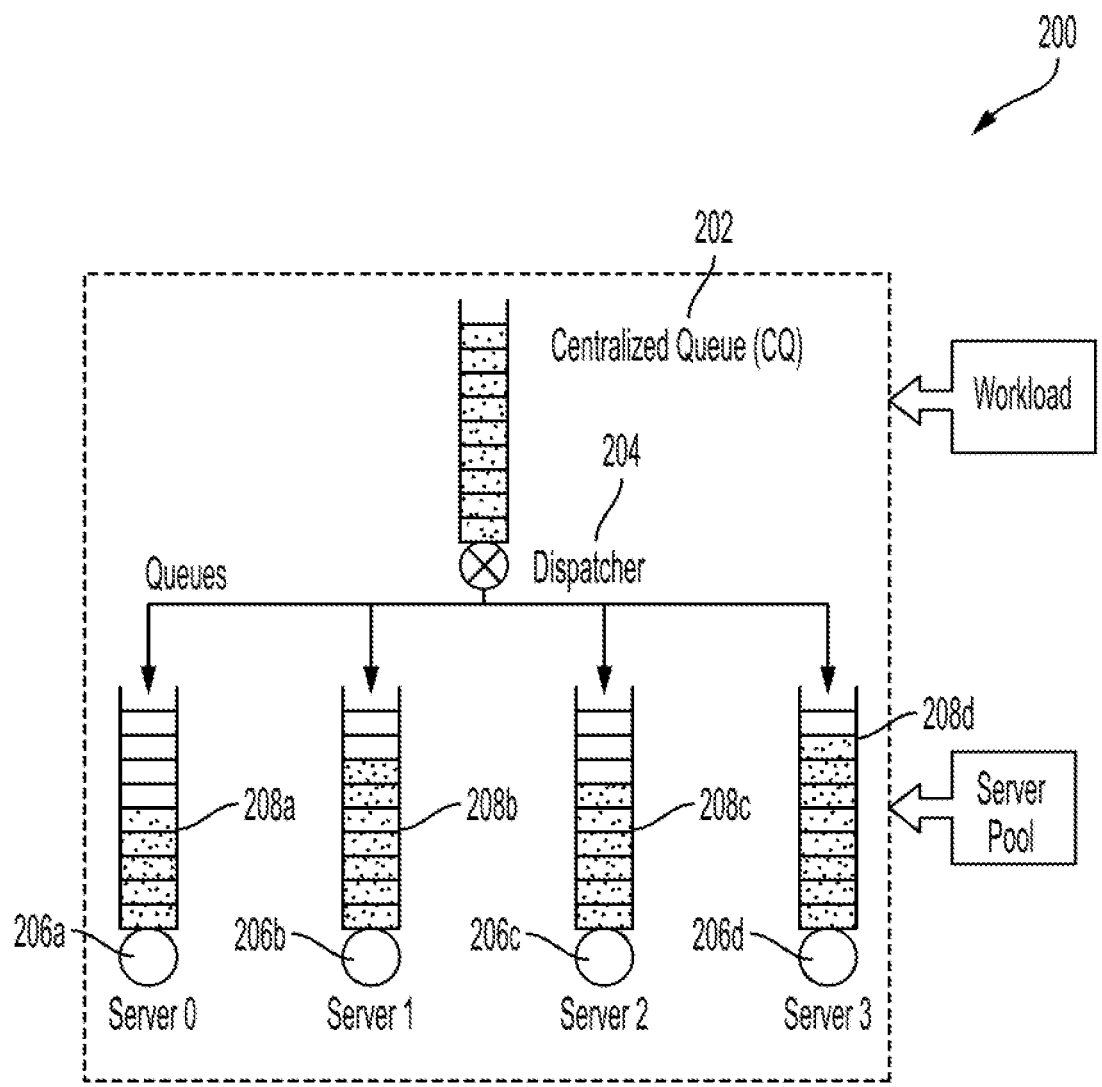
FIG. 2 illustrates an example device for dispatching jobs from a centralized queue, according to an example embodiment.

FIG. 2 illustrates an example device for dispatching jobs from a centralized queue, according to an example embodiment. Referring to FIG. 2, the device 200 includes a centralized queue (CQ) 202, a dispatcher 204, and a plurality of server nodes 206a, 206b, 206c, and 206d. In some embodiments, each of the server nodes 206a, 206b, 206c, and 206d has a corresponding queue 208a, 208b, 208c, and 208d. In some embodiments, a cloud provider system (e.g., the cloud environment 102 of FIG. 1) queues user job requests in the centralized queue 202 based on a travel path of the request. The travel path of the request, which may be determined by region, may be based on a "physical-world" geographical location (e.g., if the centralized queue is in New York, then a worker node in Chicago may be a better choice than a worker node with the same spec in Tokyo, Japan) or may be based on network-topology-based location (e.g., a closer location node's access speed may be slower than a farther location node's access speed). In some embodiments, the dispatcher 204 (e.g., the load balancing system) may be connected to the centralized queue 202 to balance the load (e.g., the user job requests) across corresponding queues 208a, 208b, 208c, and 208d of the region.

For example, in some embodiments, all requests (e.g., jobs) destined for or assigned to the device 200 (e.g., based on region) is queued in the centralized queue 202. The dispatcher 204 then distributes the queued requests to corresponding ones of the queues 208a, 208b, 208c, and 208d of the server nodes 206a, 206b, 206c and 206d according to a queue strategy. Each of the queues 208a, 208b, 208c, and 208d have a characteristic arrival rate and service rate, but the service rates of the queues 208a, 208b, 208c, and 208d may not be guaranteed to be the same as each other at a given time (e.g., runtime).

In some embodiments, the goal of the dispatcher 204 may be to balance the load across all of the queues 208a, 208b, 208c, and 208d in a selected region (e.g., geographical location). For example, in a simplified homogeneous scenario, if the requests have the same or substantially the same amount of workload (e.g., spends the same makespan), then the dispatcher 204 may simply balance the queues based on the number of queued jobs. However, the requests are usually not homogeneous, and requests (e.g., jobs) from a plurality of applications or even a single application may have significant differences (e.g., different workloads) in real cases.

Further, it may be possible for a request (e.g., job) that is initially considered suitable for a server (e.g., a server node) to later become unresponsive or "stuck," for example, when resources suddenly change or are re-allocated. In this case, in some embodiments, the requests (e.g., jobs) may be returned to a temporary queue, such that the request (or job) may be picked up by (or distributed to) other servers (e.g., other server nodes). In some embodiments, these unresponsive or "stuck" requests may be returned to the centralized queue 202 before finally being dropped, in extreme cases. In some embodiments, the nature of such requests may be learned (e.g., via a learning mode) in order to take an appropriate action, as will be discussed further below.

Figure 3:
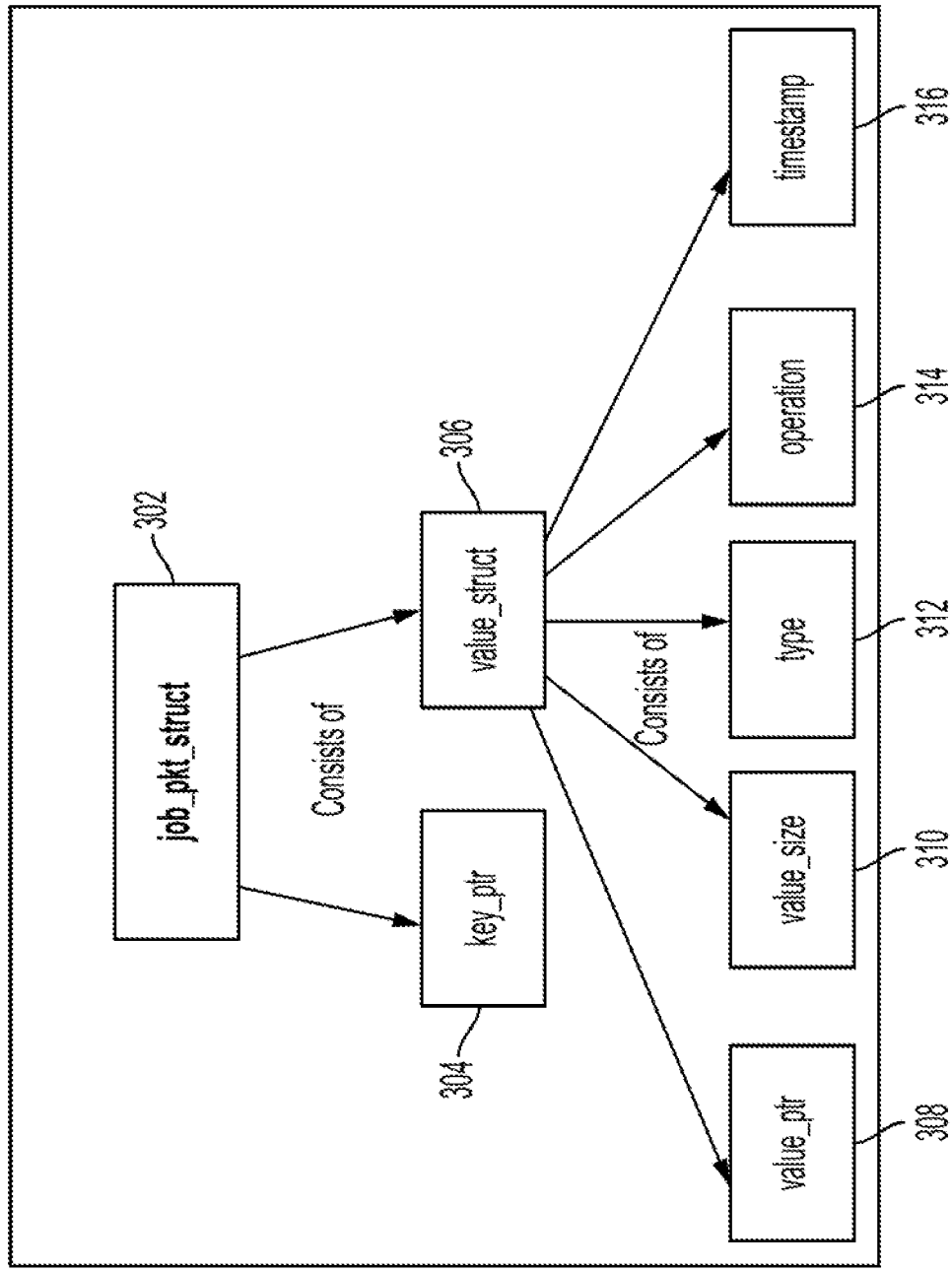
FIG. 3 illustrates a data structure topology of a job request, according to an example embodiment.

FIG. 3 illustrates a data structure topology of a job request, according to an example embodiment. Each of the parameters shown in FIG. 3 are described in more detail in the following Table 1.

TABLE 1

| Parameter | Ref. # | Description |
|---|---|---|
| job_pkt_struct | 302 | The request instanced struct containing a key and a value object |
| key_ptr | 304 | A pointer to a key |
| value_struct | 306 | An instanced value struct of the job object |
| value_ptr | 308 | A pointer to the job object, such as the data/file to be operated on |
| value_size | 310 | The size of the job object |
| type | 312 | Content type of job service |
| operation | 314 | Request operations such as get, put, delete, etc. |
| timestamp | 316 | Timestamp such as Centralized Queue entry time, in order to capture job time sensitivity |

In some embodiments, from among the parameters shown in Table 1, the value_size 310 parameter (e.g., data size) and the operation 314 parameter (e.g., read, write, delete, and the like) may have more impact on performance in terms of latency than the other parameters shown in Table 1. For example, a first request having a 4 KB I/O read and a second request having a 10 MB I/O write will have different makespans (e.g., job finish times), and thus, a load balancer (e.g., the dispatcher) should not treat the first and second requests equally. Accordingly, in some embodiments, requests (e.g., jobs) may be differentiated based on their characteristics and by determining an actual or estimated workload (e.g., makespan) associated with the request.

Figure 4:
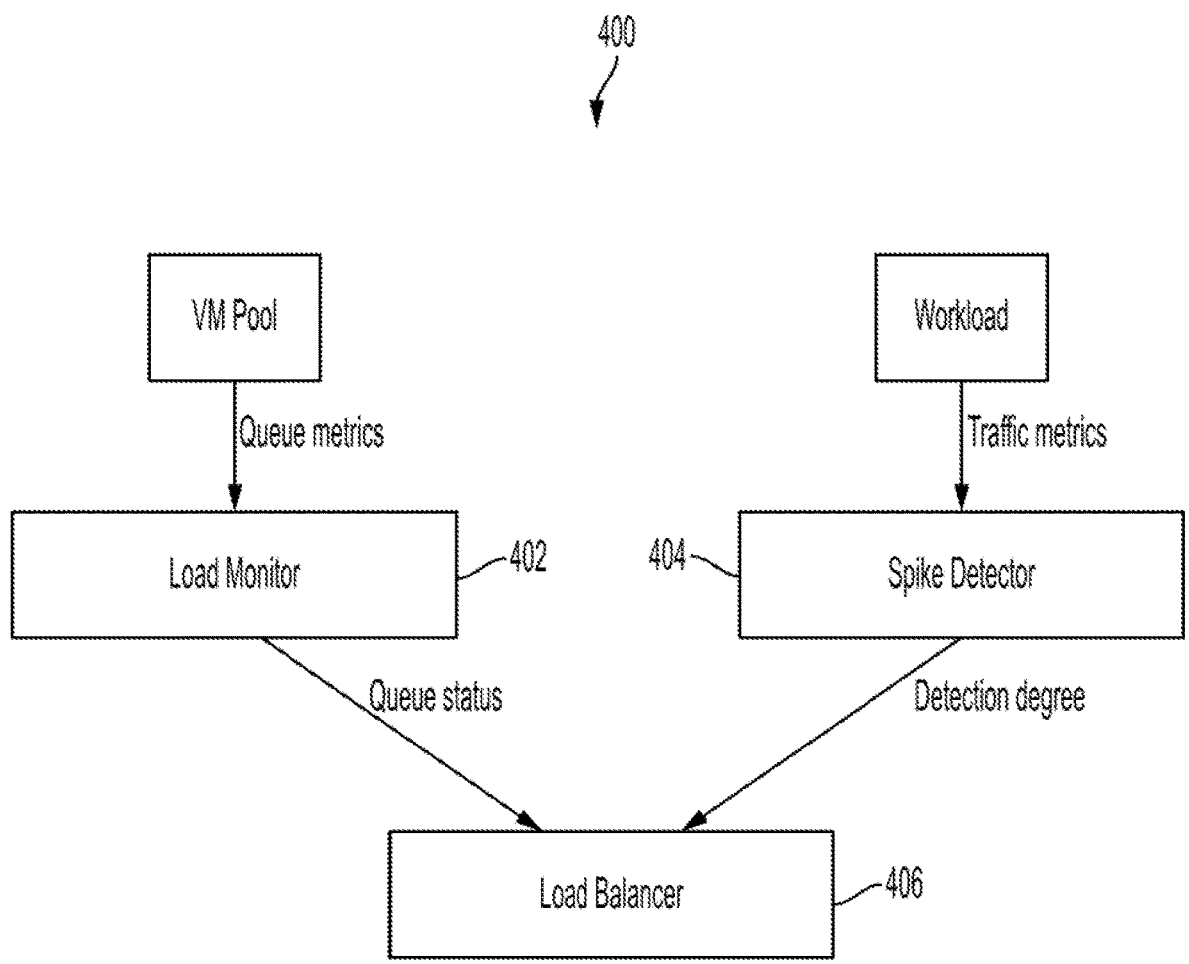
FIG. 4 illustrates a block diagram of a load balancing system operating under a first mode to balance loads, according to an example embodiment.

FIG. 4 illustrates a block diagram of a load balancing system operating under a first mode (e.g., the heuristic mode) to balance loads, according to an example embodiment. As described in more detail below, the first mode is a relatively lightweight heuristic approach that statically distributes workloads (e.g., jobs or requests) based on various spike ranges (or degrees). For example, in the first mode, workloads (e.g., jobs or requests) may be distributed to the resources using a Round Robin load balancing strategy in response to a high spike range (or degree), a Join Shortest Queue load balancing strategy in response to a medium spike range, and/or a minimum coefficient of variation (minCV) strategy in response to a low spike range. In some embodiments, the workload spikes (and corresponding spike ranges) may be detected based on a squared-coefficient of variation autocorrelation (SCV-ACF) method, which is based on a dispersion of a stochastic process, for example.

Referring to FIG. 4, in some embodiments, the load balancing system 400 includes a load monitor 402, a spike detector 404, and a load balancer 406. The load monitor 402 may monitor the resource pool (e.g., the node pool, server pool, and the like) and may provide information associated with the contents of the resource pool (e.g., the corresponding queues of each of the nodes). For example, in some embodiments, the load monitor 402 may collect load status information (e.g., number of queues, number of job requests, each request's workload amount, and/or the like) of a current queue in a region. This load status information may be used by the spike detector 404 to compute a degree (or measure) of the actual workload involved, instead of using just the number of jobs queued to compute the spike level. For example, in some embodiments, the spike detector 404 may detect (e.g., measure or compute) a spike level of the current incoming jobs (e.g., requests) for a user's centralized queue to the queues of the corresponding resource nodes. In some embodiments, the spike detector 404 may label a period (e.g., time window) associated with the current incoming jobs as a strong spiky period, a middle spiky period, or weak spiky period.

In some embodiments, the load balancer 406 may use the label provided by the spike detector 404 to determine an appropriate load balancing strategy to use in distributing the workloads (e.g., jobs or requests). In some embodiments, based on the load status information and the label, the load balancer 406 may distribute the jobs (or requests) among the queues of the resource nodes to balance the load and improve system utilization. For example, in some embodiments, during a low degree (or range) of bursty job arrivals (e.g., a weak spiky period), the load balancer 406 may have more time to make more accurate decisions based on the minCV load balancing strategy. During a medium degree (or range) of job arrivals (e.g., a middle spiky period), the load balancer 406 may use the join shortest queue load balancing strategy using information corresponding to the workload state of the queues. During a high degree (or range) of incoming traffic (e.g., a high spikey period), status information may be delayed so the load balancer 406 may use a round robin load balancing strategy.

Figure 5A:
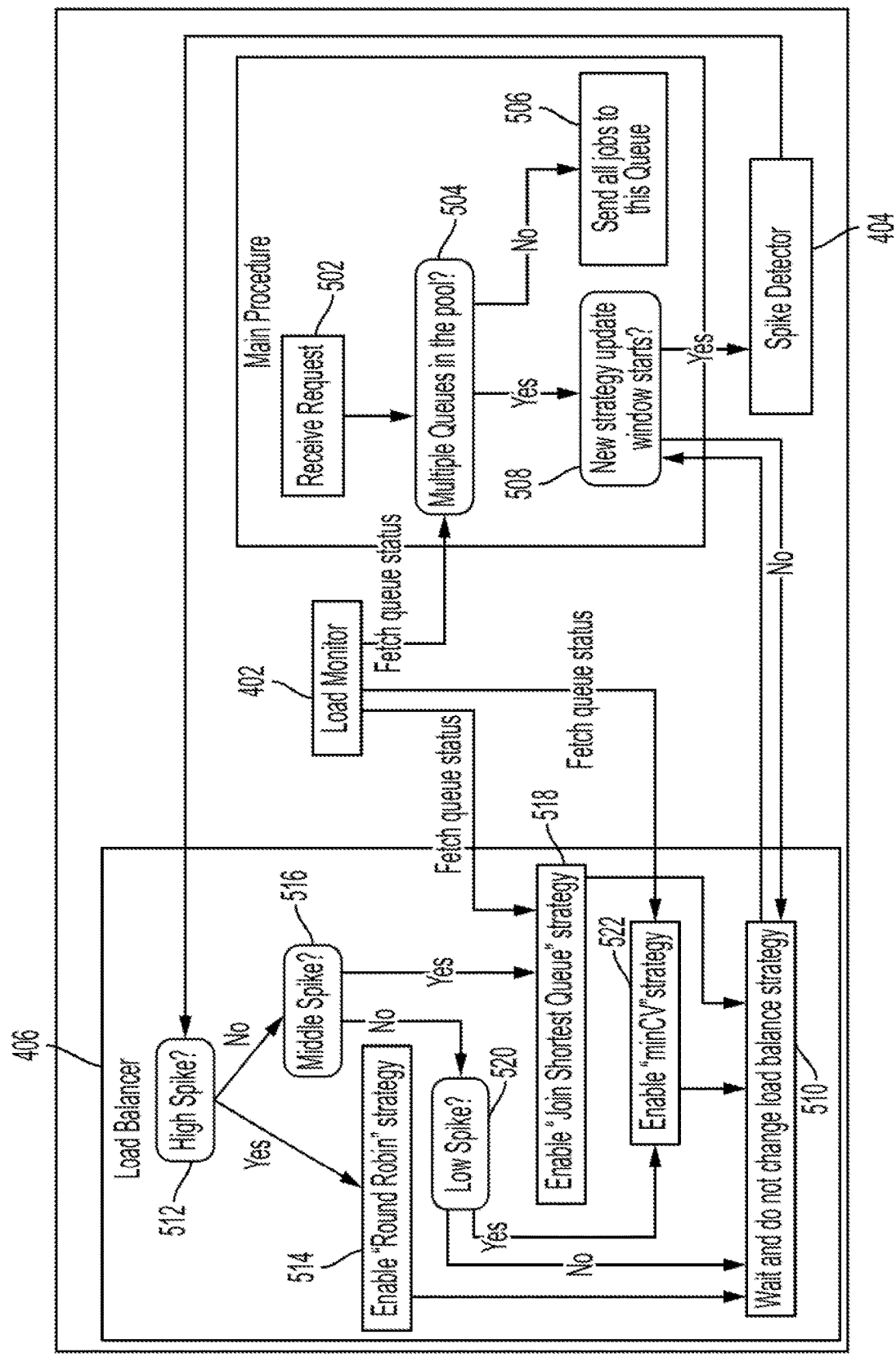
FIG. 5A illustrates a flow chart of a method for selecting an appropriate load balancing strategy under the first mode, according to an example embodiment.

In more detail, FIG. 5A illustrates a flow chart of a method for selecting an appropriate load balancing strategy under the first mode, according to an example embodiment, and FIG. 5B illustrates corresponding pseudocode for implementing the method of FIG. 5A.

Referring to FIGS. 5A and 5B, when an assigned job request is received (e.g., from a cloud provider) at block 502, the request is queued in a centralized queue (e.g., CQ 202 of FIG. 2). At block 504, the system checks whether or not the node pool has multiple queues (e.g., line 7 in FIG. 5B). If not (e.g., no), then there is only one queue so that all of the job requests are distributed to the single queue at block 506. On the other hand, if the node pool has multiple queues at block 504 (e.g., yes), then the system determines whether a current time corresponds to a new strategy update window (e.g., line 10 in FIG. 5B) at block 508. For example, Table 2 describes two epoch windows and their functions used in the first mode.

TABLE 2

| Epoch Window Name | Description |
| --- | --- |
| Strategy update window (W_SU) | A preset frequency for updating strategy as well as conducting detection of workload spike level |
| Queue status updating window (W_QSU) | A present frequency for updating the status of the queues in the report |

If the current time does not correspond to the strategy update window at block 508 (e.g., no), then the load balancer 406 may not change the load balancing strategy of the current epoch at block 510. In other words, once a load balancing strategy has been determined, the system will lock that strategy at block 510, and the load monitor 402 will be invoked (if necessary or desired) to assist with dispatching the current load balancing strategy. This "lazy" strategy updating frequency may reduce updating costs associated with constantly updating the load balancing strategy.

On the other hand, if the current time corresponds to the strategy update window at block 508 (e.g., yes), then the spike detector 404 is invoked to detect a spike degree (or level) of the current traffic in the centralized queue, and will send the spike degree result to the load balancer 406. The load balancer 406 may switch between the strategies depending on the spike degree results (e.g., lines 10-18 of FIG. 5B). For example, if the load balancer 406 determines that the spike degree is within a high spike range at block 512, then the round robin load balancing strategy may be enabled at block 514. If the load balancer 406 determines that the spike degree is within a middle spike range at block 516, then the join shortest queue load balancing strategy may be enabled at block 518. If the load balancer 406 determines that the spike degree is within a low spike range at block 520, then the minCV load balancing strategy may be enabled at block 522. Once a load balancing strategy has been determined, the system may lock that strategy at block 510, as discussed above.

Each of the load monitor 402, spike detector 404, and load balancer 406 will be described in more detail with reference to Table 3, which summarizes some symbols and their corresponding descriptions as used herein.

TABLE 3

| Symbols | Description |
| --- | --- |
| $\tau_{<i,q>}$ | Actual workload amount of request i in Queue q. The total makespan of the job. |
| $S_i$ | Job size of request i. |
| $v_i$ | Operation type of request i, e.g., get, put, delete, etc. |
| $\mu_{<v_i,q>}$ | Queue q's Service Rate for request i's operation type. |
| $\ell_q$ | Total actual workload amount of all requests queued in the Queue q. |
| {q} | Set of queued job requests in the Queue q. |
| q, c | Queue q, and Centralized Queue c in each Cloud queue region/port. Notice that this c is CQ, not User Application Layer Queues. |
| \|q\|, \|c\| | The number of requests that are queued in the Queue q, and Centralized Queue c. |
| $\|q\|_{max}$, $\|c\|_{max}$ | The preset maximal size of Queue q and Centralized Queue c, respectively. |

TABLE 3-continued

| Symbols | Description |
| --- | --- |
| $\ell_{<q,k,i>}$ | Total actual workload amount of all requests queued in the Queue q, when the new job request i is assigned to Queue k. Notice that k may be the same or not the same as Queue q, thus it is a piecewise function. |
| $\overline{\ell}_{<Q,k,i>}$ | Mean total actual workload amount of all requests queued in all Queues in the Queue set Q if the new request i is assigned to Queue k. |
| Q | The set of Queues in the current Cloud queue region. |
| $N_q$ | The number of queues in the Cloud queue region. |
| $\Omega_{<Q,k,i>}$ | The coefficient of variation (CV) of total workload amount of each Queue in the region. This value reflects the balance degree, e.g., the larger the CV there is across the Queues. |
| SCV | Squared-coefficient of variation. |
| η | Spike level, or index of dispersion. The bigger it is, the higher the spike level is. |
| θ, $\theta_{max}$ | An iterating lag's value and the preset maximal lag value (usually to be very large or even infinity) for auto-correlation function as shown in Eq. 3-3. |
| σ | The variance of the Centralized Queue (CQ) queued job number. We assume that the arrival distribution follows a wide-sense stationary process which means it is a time-independent process. |
| φ | A knob to tune the weight of autocorrelation results, usually, we can set it to 2 or 3. |
| $\|c\|_t$, $\|c\|_{t+\theta}$ | Centralized Queue (CQ) queued job numbers at time t and t + θ, respectively. |
| $\overline{\|c\|_t}$, $\overline{\|c\|_{t+\theta}}$ | Mean value of the Centralized Queue (CQ) queued job numbers at time t and t + θ, respectively. |

As discussed above, considering only the number of pending jobs (or requests) may not be enough, since the workload (e.g., makespan) of a particular job may be different from that of another job. Accordingly, in some embodiments, the load monitor 402 may differentiate jobs (e.g., requests) based on their characteristics by converting them based on their actual (or estimated) workload (e.g., makespan). For example, in some embodiments, the load monitor 402 may determine (e.g., calculate or estimate) the workload amount of a single job (or request) by dividing a size of the job request by a service rate of the queue q for the request's operation type as shown in Equation 1.

$$\tau_{<i,q>} = \frac{S_i}{\mu_{<v_i,q>}} \quad \text{Equation 1}$$

For a non-limiting example, considering a write I/O job having 1024 KB size and a write rate of that queue is 1024 MB/sec, then the workload amount (e.g., actual or estimated) is around 0.001 seconds. Accordingly, the load monitor 402 may identify information of the job's size and type, as well as each queue's service rate for this type of job, in order to calculate the workload amount of the job using Equation 1. Although all queues in a same cloud region may have the same service rate for the same type of operation, Equation 1 supports queues in the same cloud region having heterogeneous service rates for the same type of operation (e.g., as reflected by $\mu_{<v_i,q>}$ in the denominator of Equation 1).

Based on Equation 1, the total workload amount of all queued job requests in the queue q can be further calculated by summing up all the workload amounts of the requests in queue q, as shown in Equation 2.

$$\ell_q = \sum_{i \in [q]} \tau_{<i,q>} = \sum_{i \in [q]} \left( \frac{S_i}{\mu_{<v_i,q>}} \right) \quad \text{Equation 2}$$

However, it may be costly to gather and calculate queue workload status frequently. Accordingly, in some embodiments, an epoch window (e.g., queueStatusUpdateWindow), as discussed in Table 2 above, may be provided to set a periodic "recalibrate" queue status. While this can reduce overhead, it may also introduce an information delay which may lead to degregated dispatching solutions. For example, during a high traffic time (e.g., high job request spike time), this delay may lead to assigning all jobs to a queue that was the most idle in a last epoch, while other queues become idle after they have finished their queued jobs. This imbalance may not only wastes system resources but can cause backlogs. Accordingly, in some embodiments, the spike detector 404 may detect the spike level such that different load balancing strategies may be enabled for different spike levels.

For example, in some embodiments, in order to enable the system to qualitatively capture job request spikes in a single score (e.g., a level or degree value), while predicting (or identifying) a start and an end of a spike period, the spike detector 404 may utilize the SCV-ACF based spike detection method. For example, the level of spikes may be defined as an index ($\eta$) of dispersion of a stochastic process, as shown in Equation 3.

$$\eta - SCV \left( 1 + \alpha \cdot \sum_{\theta \in [1, \theta_{max}]} \left( \frac{E[(|c|_{t+\theta} - \overline{|c|_{t+\theta}}) \cdot (|c|_t - \overline{|c|_t})]}{\sigma^2} \right) \right) \quad \text{Equation 3}$$

Accordingly, in some embodiments, the spike level may correspond to a squared-coefficient of variation (SCV) of an autocorrelation-based function (ACF). In some embodiments, the joint presence of SCV and autocorrelations may be sufficient to differentiate between job workloads with different spikes intensities. In Equation 3, $\alpha$ may refer to a preset knob to adjust the weight of ACF (e.g. 2 or 3), $\theta$ refers to a lag time between t and t+$\theta$, and $\sigma$ refers to the variance of the Centralized Queue (CQ) queued job number. In some embodiments, Equation 2 assumes that the arrival distribution follows a wide-sense stationary process, meaning that it is a time-independent process. As a result, the autocorrelation depends only on the lag time $\theta$, since the correlation depends only on the time-distance (or time-period) between the pair of values and not on their position in time.

Figure 6:
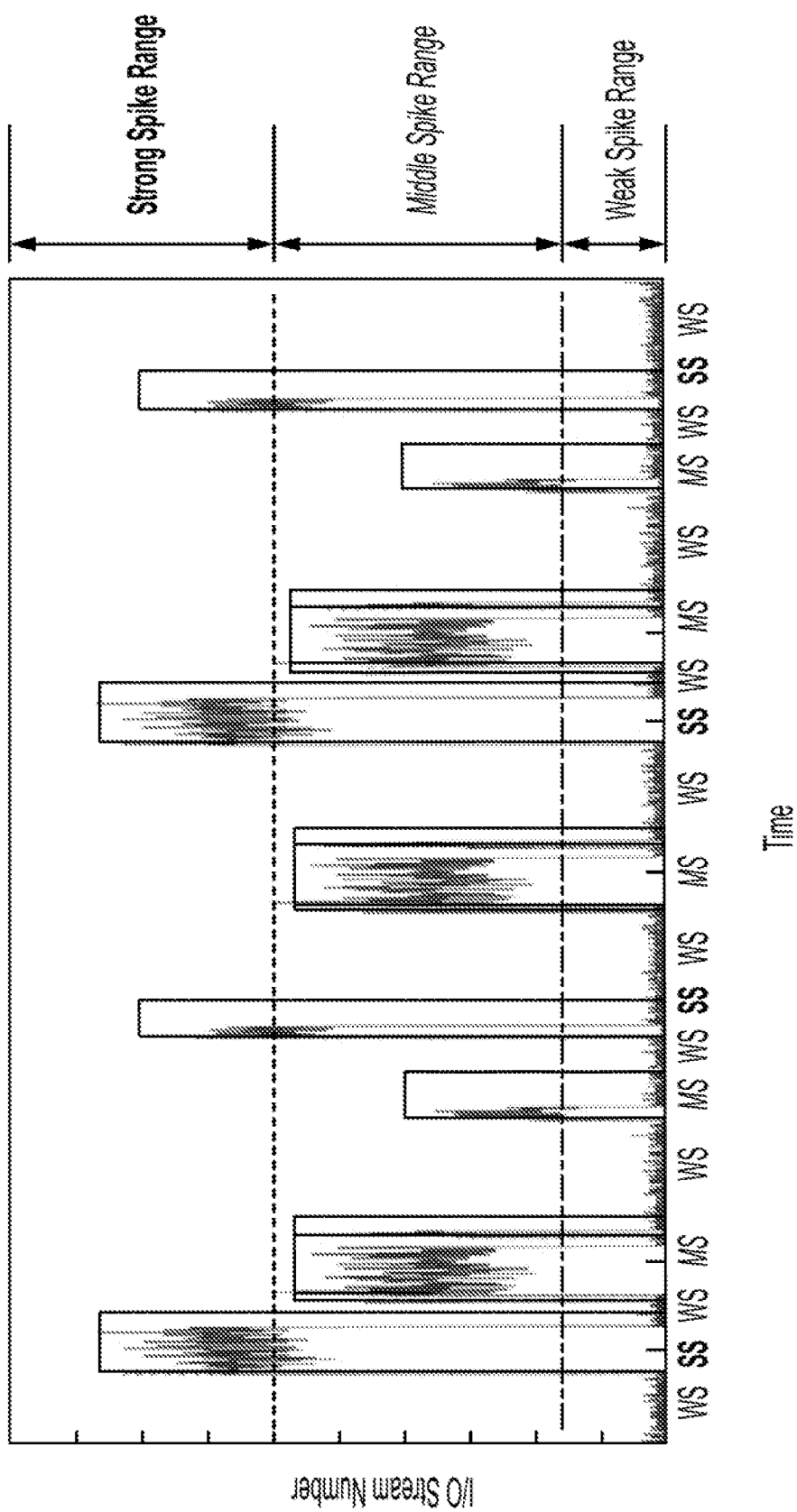
FIG. 6 illustrates a graph of the SCV-ACF based spike detection method, according to an example embodiment.

FIG. 6 illustrates a graph of the SCV-ACF based spike detection method, according to an example embodiment. In the graph of FIG. 6, a strong spike is represented by the reference symbol SS, a middle spike is represented by the reference symbol MS, and weak spike is represented by the reference symbol WS. As shown in FIG. 6, I/O stream numbers that fall within a corresponding range may determine how the spike level is categorized. For example, if the I/O stream numbers fall within a first range (e.g., a weak spike range), the spike level may be categorized as a weak spike WS. If the I/O stream numbers fall within a second range (e.g., a middle spike range), the spike level may be categorized as a middle spike MS. If the I/O stream numbers fall within a third range (e.g., a strong spike range), the spike level may be categorized as a strong spike SS. Accordingly, in some embodiments, the spike detector 404 may categorize each job request of the current epoch into one of the three spike levels shown in FIG. 6 based on the ranges (e.g., preset ranges) of the spike level types.

Figure 7A:
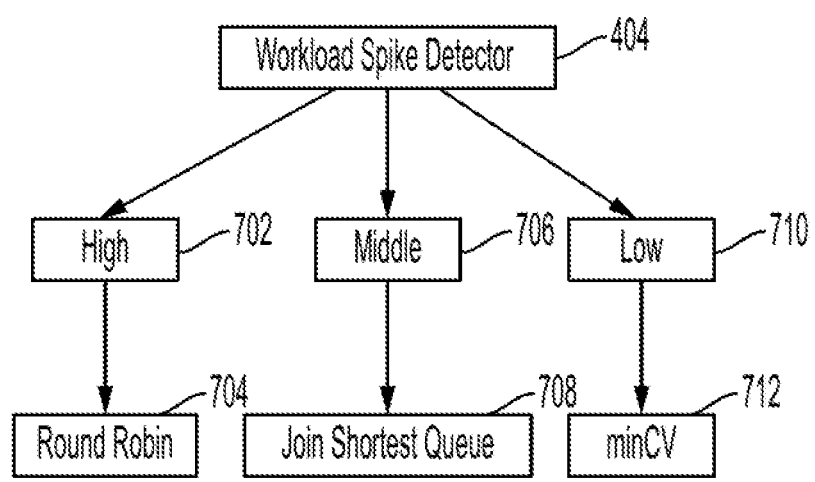
FIG. 7A is a block diagram illustrating a corresponding load balancing strategy for each spike level determined by a spike detector, according to an example embodiment.

FIG. 7A is a block diagram illustrating a corresponding load balancing strategy for each spike level determined by the spike detector 404, according to an example embodiment, and FIG. 7B illustrates example pseudocode for implementing the various load balancing strategies of FIG. 7A, according to an example embodiment.

As discussed above, workload imbalance may cause resource underutilization and/or system performance degradation. One challenge during load balancing is determining whether the queue status information is trustworthy. For example, constantly gathering the queue status information (e.g., job size, job type, queue's service rate, and/or the like) may require large overhead, whereas older status information may be out-of-date. Accordingly, in some embodiments, the system may detect the spike level to switch between the different load balancing strategies based on different trust levels of the queue status information. For example, queue status information that is gathered during high request traffic periods (e.g., high spike level) is generally less trustworthy than queue status information gathered during low traffic times (e.g., weak spike level).

Accordingly, as shown in FIG. 7A, in some embodiments, during high traffic periods (e.g., high spike level) 702, the load balancer 406 may select the round robin load balancing strategy 704. During medium traffic periods (e.g., middle spike level) 706, the load balancer 406 may select the join shortest queue load balancing strategy 708. During low traffic periods (e.g., weak spike level) 710, the load balancer 406 may select the minCV load balancing strategy 712. Each of these strategies will be discussed in more detail below.

In the case of high traffic periods (e.g., a large number of requests are detected by the load monitor 402), the load balancer 406 may enable the round robin load balancing strategy, which has low or no overhead since the queue status information or complicated load balancing calculations are not needed. For example, during such high traffic periods, determining the workload amount of each queue may be costly, and the queue status information may be frequently out-of-date due to delays from the high traffic. Such delays may mislead the system, for example, by sending all job requests to a previous lowest workload queue, which may result in imbalance due to saturation of that queue. In other words, since the queue status information cannot be trusted, and there is no time to conduct complicated calculations on the large amount of high traffic, the round robin load balancing strategy may be enabled during high traffic periods.

For example, in some embodiments, as shown in Equation 4, the system may maintain the previous queue number k, and may add a one for each new job request. If the queue number k exceeds a boundary, it goes back to zero (e.g., since the queue number is from 0 to Nq−1), as shown in Equation 4.

$$k = \begin{cases} k+1, & k \in [0.N_q - 2] \\ 0, & k = N_q - 1 \end{cases} \quad \text{Equation 4}$$

As shown from Equation 4, the left-hand-side k represents a next round selection of k to assign the new job request, and this k value is based on its own previous value (k+1). Since the round robin load balancing strategy is independent on the characteristics of the new job request, the constraint is that we need to make sure the selected queue (as well as all other queues) is (are) not full, as shown in Equation 5.

$$|k| < |k|_{max} \quad \text{Equation 5:}$$

In the case of middle (or medium) traffic periods, the load balancer 406 may enable the join shortest queue (JSQ) load balancing strategy, which aims to balance the load across the queues while reducing the probability that any one queue has several jobs pending while the others are idle. During middle traffic periods, since the delay of the queue status information and the actual queue status is smaller than that of higher spike level epochs, the delayed queue status information may be more trustworthy than during high spike situations. Accordingly, during middle traffic periods, the load balancer 406 may have more time to retrieve and utilize more detailed queue status information.

In various embodiments, the JSQ load balancing strategy may be implemented based on the number of queued jobs and/or based on the actual (or estimated) workload amount. For example, in some embodiments, the JSQ load balancing strategy may simply use the number of queued jobs to represent the workload amount. This implementation method may be beneficial in cases where the overall system utilization ratio is very high, since it may be faster than using actual (or estimated) workload amounts of each queue. Accordingly, in some embodiments, the load balancer 406 may enable the JSQ load balancing strategy to assign the incoming job request to the queue with the least number of queued request, as shown in Equation 6.

min: $|k|+1$ s.t.:

$$|k| < |k|_{max} \quad \text{Equation 6:}$$

In some embodiments, given a set of queues Q, Equation 6 may be written as shown in Equation 7.

$$\underset{k \in \{Q\}}{\operatorname{argmin}} (|k|+1) \quad \text{Equation 7}$$

While using the number of queued jobs may be faster than using actual (or estimated) workload amounts of each queue, the tradeoff may be accuracy since the number of queued jobs does not consider the load differences between the jobs. Accordingly, in some embodiments, to reflect the actual (or estimated) workload amount more accurately, the load balancer 406 may enable the JSQ load balancing strategy to further calculate the actual (or estimated) workload amount of each queue, adding the new job request's (converted) workload amount. For example, in some embodiments, the load balancer 406 may first define the total actual workload amount of all job requests present in the queue q, when a new request I is assigned to the queue k. Given k, the queue q's total amount of workload may be calculated using Equation 8.

$$\ell_{\langle q,k,i \rangle} = \begin{cases} \sum_{j \in \{q\}} \tau_{\langle j,q \rangle}, & k \neq q \\ \left( \sum_{j \in \{q\}} \tau_{\langle j,q \rangle} \right) + \tau_{\langle i,q \rangle}, & k = q \end{cases} \quad \text{Equation 8}$$

As shown in Equation 8, k may or may not be equal to q, and thus, is a piecewise function. Accordingly, as shown in Equation 9, an optimization framework may be to find the queue k where the load is lowest (including the newly added job if the queue is not full). Thus, the load balancer 406 may assign the incoming request to the queue with the least actual (or estimated) workload amount of queued requests using Equation 9.

$$\min: \ell_{\langle k,k,i \rangle} = \left( \sum_{j \in \{k\}} \tau_{\langle j,k \rangle} \right) + \tau_{\langle j,k \rangle} + \tau_{\langle i,k \rangle} \quad \text{Equation 9}$$

s.t.: $|k| < |k|_{max}$

In some embodiments, given a set of queues Q and the new job request i, Equation 9 may be written as shown in Equation 10.

$$\underset{k \in \{Q\}}{\operatorname{argmin}} \ell_{\langle k,k,i \rangle} \quad \text{Equation 10}$$

In case of low (or weak) traffic periods, the load balancer 406 may enable the minCV load balancing strategy, since the load balancer 406 may have more time to conduct a full optimization considering both actual (or estimated) workload amount, and a more accurate balance degree measurement. In some embodiments, the actual (or estimated) workload amount may be calculated, for example, using Equations 1 and 2 discussed above. The balance degree measurement may be calculated using a standard deviation (e.g., the square root of the variance), but requires the same units (e.g., the absolute number of inputs) as the mean. Accordingly, in some embodiments, the load balancer 406 may evaluate the dispersion of the queue workload distribution using Coefficient of Variation (CV), also known as Relative Standard Deviation (RSD), which is the ratio of the standard deviation to the mean. For example, in some embodiments, for any given k (which corresponds to the selected queue to be assigned the job request), the load balancer 406 may calculate a mean total actual workload amount of all requests queued in all queues in the queue set Q using Equation 11.

$$\overline{\ell_{\langle Q,k,i \rangle}} = \frac{\sum_{q \in Q} \ell_{\langle q,k,i \rangle}}{N_q} \quad \text{Equation 11}$$

The load balancer 406 may then calculate the CV (represented by Ω in Equation 12) by dividing the standard deviation by the mean calculated in Equation 11 as shown in Equation 12.

$$\Omega_{\langle Q,k,i \rangle} = \frac{\sqrt{\frac{\sum_{q \in Q} (\ell_{\langle q,k,i \rangle} - \overline{\ell_{\langle Q,k,i \rangle}})^2}{N_q}}}{\overline{\ell_{\langle Q,k,i \rangle}}} \quad \text{Equation 12}$$

As shown in Equation 12, given a queue k that is selected to accept a new request i, the balance degree of all queues in the queue set Q after the new request is added to k is $\Omega_{<Q,k,i>}$. In this case, a smaller CV value ($\Omega$) indicates a better load balancing result in the cloud region/port. Accordingly, in some embodiments, the load balancer 406 may implement the minCV load balancing strategy using Equation 13, which aims to minimize or reduce the imbalance degree.

$$\min: \Omega_{(Q,k,i)} = \frac{\sqrt{\frac{\sum_{q \in Q}(\ell_{(q,k,i)} - \overline{\ell_{(Q,k,i)}})^2}{N_q}}}{\overline{\ell_{(Q,k,i)}}} \quad \text{Equation 13}$$

$$\text{s.t.: } q, k \in Q$$
$$|q| \le |q|_{max}$$
$$|k| < |k|_{max}$$

As shown in Equation 13, an optimization framework minCV is provided to minimize or reduce the objective function under three constraints (e.g., s.t. in Equation 13). The first constraint ensures that q (iterated queue) and k (queue to assign the new job) are in the set of all available queues in the region. The second and third constraints ensure that queues should not queue more than their preset queue capacity (e.g., $|q|_{max}$ and $|k|_{max}$) in the unit of job request numbers. This optimization framework is referred to as minCV, since it aims to minimize the CV of queue actual workload amounts by identifying the k to achieve the minimal value of CV, as shown in equation 14.

$$\underset{k \in Q}{\text{argmin}} \, \Omega_{(Q,k,i)} \quad \text{Equation 14}$$

Figure 8:
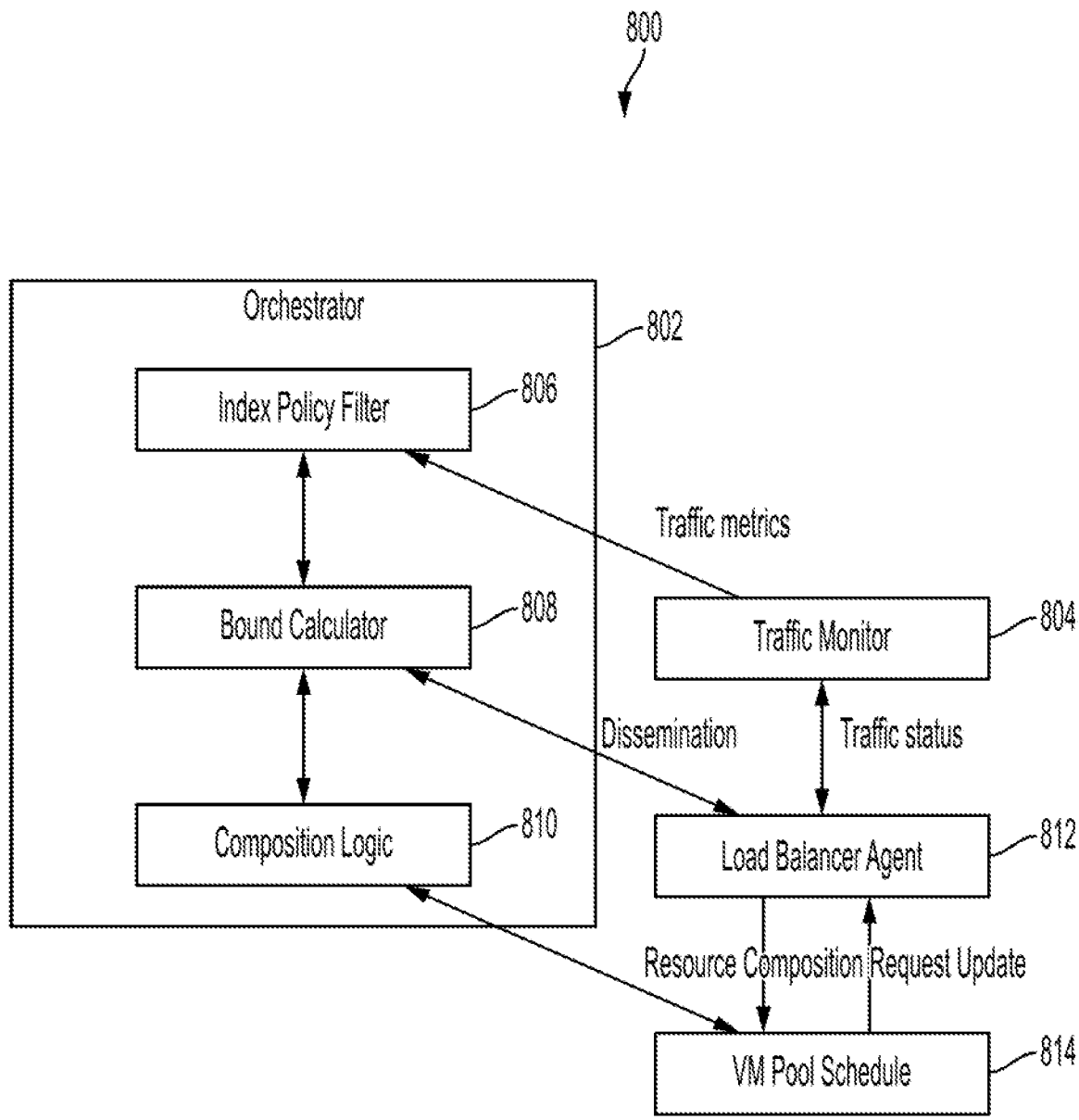
FIG. 8 illustrates a block diagram of a load balancing system operating under a second mode to balance loads, according to an example embodiment.
Figure 9:
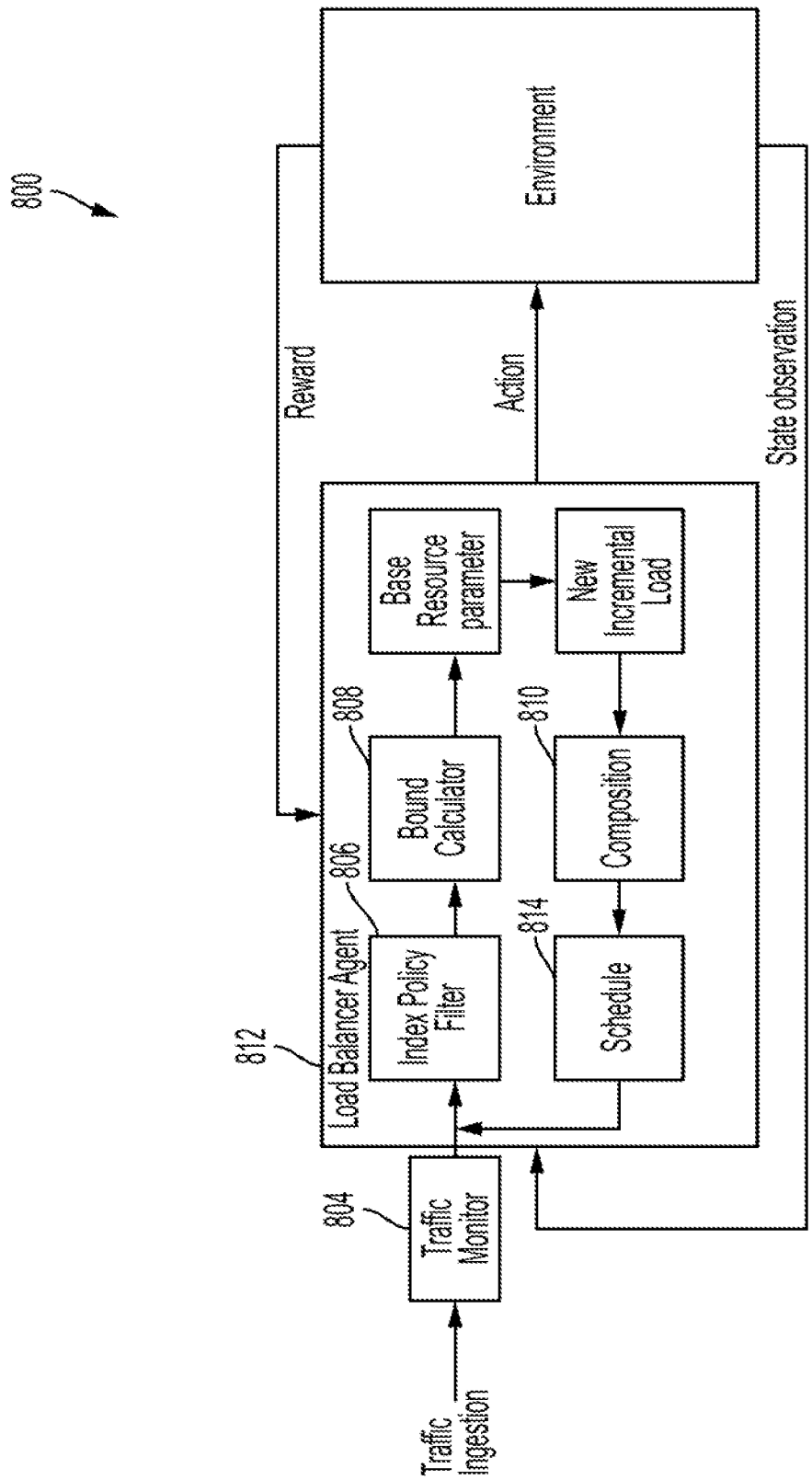
FIG. 9 is a system diagram of a load balancing system, according to an example embodiment.

FIG. 8 illustrates a block diagram of a load balancing system operating under a second mode to balance loads, according to an example embodiment. FIG. 9 is a system diagram of the load balancing system of FIG. 8, according to an example embodiment. As described in more detail below, the second mode is a machine learning (e.g., reinforcement learning) based method that uses an index (e.g., Gittins index) to predict spike values within a particular job completion time. In some embodiments, when operating under the second mode, the system may be enabled to respond to a spectrum of spike values, instead of the spike levels of the first mode that are divided based on the configured (e.g., pre-configured) ranges (e.g., weak spike range, middle spike range, and strong spike range). Further, in some embodiments, when operating under the second mode, the system may be enabled to dynamically adjust the load balancing strategies according to changing workload conditions over time, instead of being limited to the pre-configured load balancing strategies (e.g., round robin, join shortest queue, and minCV) of the first mode. In some embodiments, the system operating under the second mode may be enabled to support job requests having an expire due time (e.g., also referred to hereinafter as time-sensitive job requests), and/or may add or remove resources dynamically in response to bursty traffic periods.

Referring to FIGS. 8 and 9, in some embodiments, the system 800 may include an orchestrator 802, a traffic monitor 804, an index policy filter 806, a load agent (or load balancing agent) 812, a bound calculator 808, composition logic 810, and a resource pool (or VM pool) scheduler 814.

In some embodiments, the traffic monitor 804 may monitor the central queue (e.g., CQ 202 in FIG. 2) and may transmit status information of the central queue. In some embodiments, the index policy filter 806 may manage time-critical information including time window decisions. In some embodiments, the load balancing agent 812 may enable various load balancing strategies based on machine learning methods (e.g., reinforcement learning (Q-learning)). For example, in some embodiments, as shown in FIG. 9, the load balancing agent 812 may distribute a load to the pool of resource nodes according to a selected load balancing strategy (e.g., Action), observe a state of the pool of resource nodes in response to the load balancing strategy (e.g., State observation), calculate a reward based on the observed state (e.g., Reward), and adjust the load balancing strategy based on the reward. In some embodiments, the bound calculator 808 may communicate the load balancing agent's 812 confidence in meeting job requirements. In some embodiments, the composition logic 810 may enable the load balancing agent 812 to add or remove resources (e.g., from the resource pool). In some embodiments, the resource pool scheduler 814 may prepare job requests to be scheduled into an appropriate queue.

In brief overview, the system 800 may be broken up into a detection phase and a dissemination phase as two main phases. In some embodiments, the traffic monitor 804 and the index policy filter 806 are primarily involved with the detection phase (e.g., spike detection and time-critical job support functions), whereas the load balancing agent 812, the bound calculator 808, the composition logic 810, and the resource pool scheduler 814 are primarily involved with the dissemination phase (e.g., load balancing and dynamic resource adjustment). In some embodiments, the bound calculator 808 may be considered as the learning "glue" that processes the detection information for load balancing action.

In some embodiments, during the detection phase, the orchestrator 802 receives input from a local traffic monitor 804 concerning the job request arrivals. The job request arrivals are passed through the index policy filter 806 where each window of burst is time stamped. For example, a Gittins index of 0.7 suggests that 70% of the job requests arrive in half the time interval, and the remaining 30% of the job requests arrive in the other half of the time interval. In some embodiments, during this arrival process two kinds of actions may be taken. A first action that may be taken is the overall optimal strategy for preempting traffic, and a second action that may be taken is computation of the Gittins index. In some embodiments, an optimal strategy of allocating compute resources may be computed based on how the traffic construction grows over time.

For example, an initial construction may begin with a two time period division of a window, and gradually resources over number of requests may be generated on each half of the time axis according to the Gittins index computation. The output may be sent to the bound calculator 808, where an incremental load value may be calculated based on the predicted spike requirement. The calculated incremental load value may then be used in the next phase (e.g., the dissemination phase) to reallocate resources, for example.

During the dissemination phase, the orchestrator 802 may measure a resource increment (I) used for the change in the initial allocation, and may perform re-computation of the desired resource requirement. This may be given as input to a composition logic 810. Accordingly, the dissemination phase may work in cooperation with the infrastructure that plays an integral role in resource provisioning in the cloud.

For example, the composition logic 810 may perform the requested resource VM chaining tailoring to the service demands in the SLA (Service Level Agreement) or QoS (Quality of Service).

According to some embodiments, a spike indication parameter based on the Gittins index enables the system 800 to predict the spike value within a specified job completion time with very few parameters. This enables the system 800 to balance loads while maximizing profits for an operator. For example, burstiness may be described based on a single parameter, and this parameter may allow learning traffic behavior and may provide feedback to the operator on the fly. More specifically, in some embodiments, the model fitting and trace generation is efficient, as it scales linearly with the size of the data. The system 800, according to some embodiments, utilizes reinforcement learning as a machine learning strategy, since reinforcement learning is a "fail-fast-learn-fast" approach.

For example, in some embodiments, entropy may be defined as the uniformity of a discrete probability function P. An entropy value E(P) for an event P with probability $p_i$ is defined in Equation 15.

$$E(P) = \sum_{i=1}^{n} p_i \log_2 1/p_i \quad \text{Equation 15}$$

Where the variables of Equation 15 are defined in Table 4.

TABLE 4

| Symbol | Description |
| --- | --- |
| E(P) | Entropy of event P |
| $p_i$ | Probability of an event p |
| $E(P) = \sum_{i=1}^{n} p_i \log_2 1/p_i$ | Calculation of Entropy |

As shown in Equation 15, when all the probability values are equal (or the same), then entropy reaches a maximum value. On the other hand, if one event dominates, then entropy approaches zero. Thus, in some embodiments, entropy describes the burstiness, and a global value of burstiness per se is judged by a Hurst parameter. It is actually a notion of self-similarity, but self-similar processes do not always generate a bursty sequence. In addition, the Hurst parameter pertains to usage over large time scales. Accordingly, in some embodiments, inspiration is drawn from a statistical index called the Gittins index.

Typically, the Gittins index is used as a parameter that demarcates requests within a time interval. For example, a Gittins index of 0.7 suggests that 70% of the requests arrive in half the time interval and the remaining 30% in the other half. During this arrival process, two kinds of actions may be taken, one action is the overall optimal strategy for pre-empting traffic, and the other action is computation of the Gittins index. In some embodiments, the optimal strategy of allocating computing resources may be determined based on how traffic construction grows over time. For example, the initial construction begins with the two-time division and gradually recurses over the number of requests generated on each half of the time axis according to the Gittins index computation. In some embodiments, how fast the Gittins index can be computed is not the intention, but instead, the insights gained by using the index as an input to learn the traffic characteristics. For example, in some embodiments, as the value of the Gittins index approaches 1, higher traffic irregularity may be assumed since uniform traffic index values are typically around 0.5.

In some embodiments, the second mode (e.g., the learning mode) may be used to cater to an arbitrary distribution (e.g., unlike the first mode catering to a uniform distribution). For example, in some embodiments, the second mode may encompass uniform distribution as a special case scenario. In some embodiments, the traffic considered in most scenarios under the second mode may be described as a poisson traffic that is not always self-similar. For example, different user requests ranging from multimedia, gaming applications, to web apps have shown the drastic need to manage quality of service in such environments. Typically, when the load in a network goes beyond a usual load barometer there is a need to manage such a change. Hence, such distributions are arbitrary and may need to be brought under an indexable umbrella. In other words, the indexability of the second mode may enable converting a non-machine learning problem into a machine learning problem. In some embodiments, the function is monotonically increasing making the overall traffic indexing easier. Further, in some embodiments, the arrival distributions may be mapped as an onto function to the traffic arrival.

In some embodiments, the Gittins index enables job preemption, that is, time critical jobs may be performed first, instead of following a first come first serve (e.g., FCFS) job completion. For example, consider a scenario where the overall jobs being queued is of two types, namely, best effort and time sensitive traffic. In some embodiments, the fresh arrival time and schedule based on the Gittins index is computed to stall the traffic that is either stagnant in the queue or who's resource occupation is unknown.

Figure 10A:
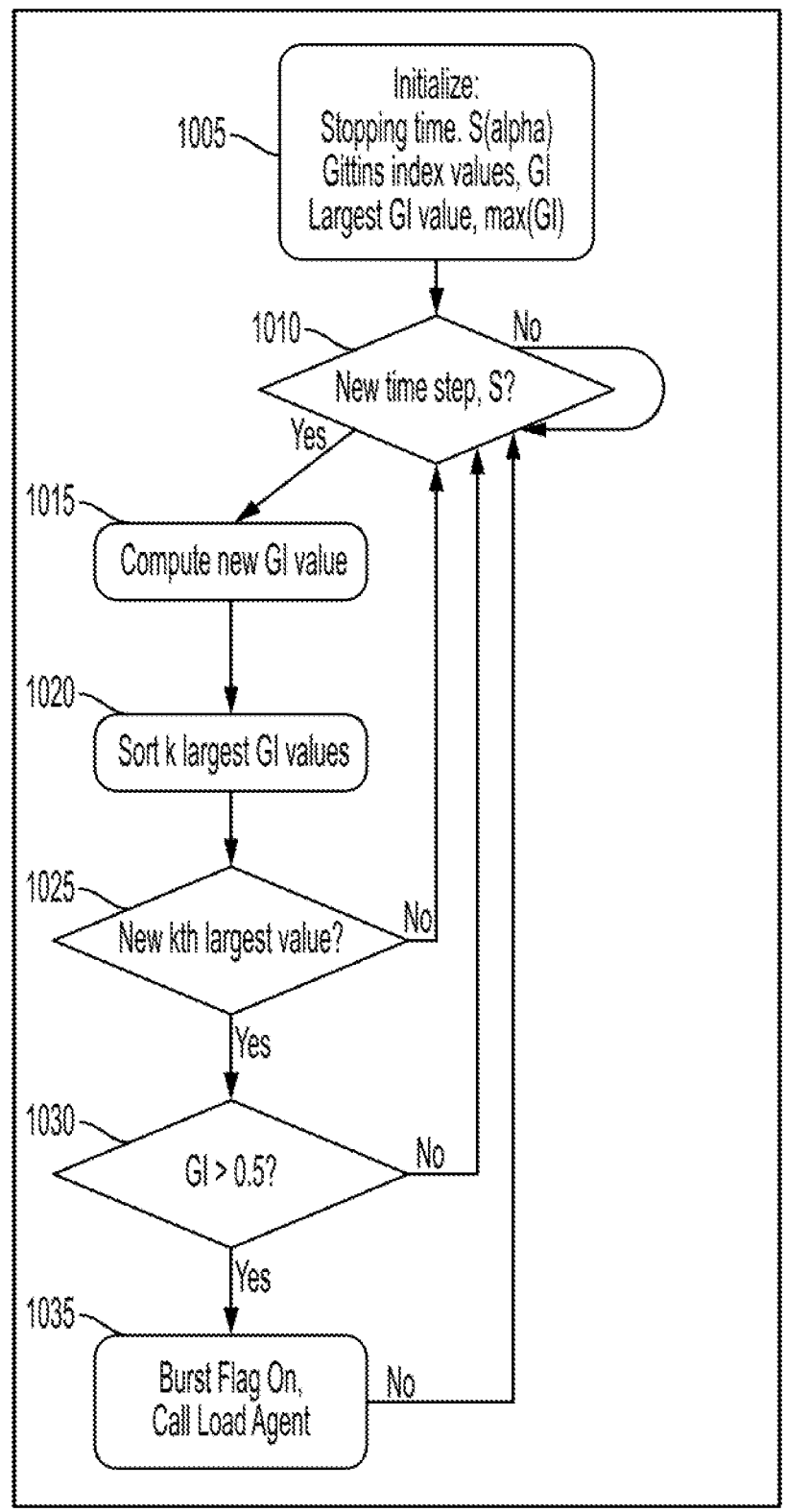
FIG. 10A illustrates an example flow diagram of a method for detecting spikes, according to an example embodiment.

In more detail, FIG. 10A illustrates an example flow diagram of a method for detecting spikes, according to an example embodiment, and FIG. 10B is a corresponding pseudocode of the spike detection method of FIG. 10A. Referring to FIGS. 8, 9, 10A, and 10B, in some embodiments, the flow of control starts from detection. Once the detection occurs, the index (e.g., the Gittins index) allows the traffic to be segregated as time critical and best effort traffic. Likewise, the index can characterize the traffic based on how bursty it is and the degree of burst defined from the Hurst parameter. In some embodiments, in order to satisfy the burst request, more resource requirements may be desired in such scenarios, which can be satisfied by composing a new virtual compute environment. In some embodiments, the load balancer includes the bound calculation parameters (e.g., as calculated by the bound calculator 808) and a new load increment value (e.g., based on the degree of burst). In some embodiments, the time critical nature of jobs may be monitored by both the index policy filter 806 and the traffic monitor 804.

For example, in some embodiments, as job requests are queued (e.g., in the CQ 202 of FIG. 2), the traffic monitor 804 monitors the queue for spike detection. In some embodiments, the traffic monitor 804 may calculate a Gittins index metric to segregate the traffic. For example, Table 5 defines some symbols and their related descriptions of the algorithms used for spike detection, according to some embodiments.

TABLE 5

| Symbol | Description |
|---|---|
| S($\alpha$), C($\alpha_k$) | State a, Stopping set S(a), Continuing set (C(a) |
| $\lambda(\alpha)$, $\zeta$ | Gittins Index Value for 'a', Globally initialized Gittins Index value |
| T(S($\alpha$)), $\beta^t$ | Time to completely traverse stopping set S(a) T(S(a)) with t > 0: Xt \in S(a), discount parameter |
| $r^t(X_t)$, I | reward for state space (Xt), T(S(a)) with t > 0: Xt \in S(a), Identity Matrix |
| $Q''_{a,b} = \begin{cases} P_{a,b}, & \text{if } b \in C(\alpha_k) \\ 0 & \text{otherwise} \end{cases}$ | Markovian update function, |
| $\dfrac{d^k_{\alpha_k}}{b^k_{\alpha_k}}$ | GI calculation formula |
| $E\left[\sum_{t=0}^{T(S(\alpha))} \beta r^t(X_t) \mid X_0 = \alpha\right]$ | Expectation of the reward based on prior knowledge |
| $\max \dfrac{E\left[\sum_{t=0}^{T(S(\alpha))} \beta r^t(X_t) \mid X_0 = \alpha\right]}{E\left[\sum_{t=0}^{T(S(\alpha))} \beta^t \mid X_0 = \alpha\right]}$ | maximum value of the Bayesian expectation |

Referring to FIGS. 10A and 10B, consider at time t=t1, a first spike is received in the network. A decision to be made here (e.g., the ultimate decision of flow diagram of FIG. 10A, may be referred to as successful spike detection. Accordingly, for any other value determined by the flow diagram of FIG. 10A may be considered to be a failure. For example, the decision to be made by the flow diagram of FIG. 10A may follow a Bernoulli decision of success and failures. In some embodiments, as this problem may likely evolve exponentially based on service rates, this problem may be proved as NP-complete (or in other words, increase of service rate leads to increase of computation time which is not in the polynomial order. Accordingly, in some embodiments, a scalar may be modeled based on a stopping time T, which is a time when the detection phase transitions to the dissemination phase.

For example, at block 1005, the traffic monitor 804 may initialize. During initialization, the traffic monitor 804 may determine the highest Gittins index (GI), $\zeta$ using Equation 16. The stopping phase for a state $\alpha$ may be defined as S($\alpha$), such that if $\alpha_1$ has the highest GI, then $\zeta$=S($\alpha_1$).

$$\lambda(\alpha) = \max \frac{E\left[\sum_{t=0}^{T(S(\alpha))} \beta r^t(X_t)[X_0 = \alpha]\right]}{E\left[\sum_{t=0}^{T(S(\alpha))} \beta^t [X_0 = \alpha]\right]} \text{ where}$$

$$S(\alpha) \subset \zeta$$

Equation 16

Within the stopping phase S for the state $\alpha_1$ at block 1010, blocks 1015, 1020, and 1025 are iterated over the $\alpha_1$ state such that if C($\alpha$k)=$\alpha$1 . . . $\alpha$k-1 represents the next $k^{th}$ largest GI, this may be represented by Equation 17.

$$Q''_{a,b} = \begin{cases} P_{a,b}, & \text{if } b \in C(\alpha_k) \\ 0 & \text{otherwise} \end{cases}$$

Equation 17

In Equation 17, $P_{a,b}$ represents the reward function using an m×1 matrix. Further, if I represents the m×m identity matrix, then we may compute the value of Gittins index GI by first using two assistant equations (Equations 18 and 19):

$$d^{(k)} = [I - \beta Q'^{(k)}]^{-1} \zeta$$

Equation 18:

$$b^{(k)} = [I - \beta Q'^{(k)}]^{-1} 1$$

Equation 19:

Based on Equations 18 and 19, the value of the Gittins index GI may be computed from Equation 20.

$$GI = \frac{d^k_{\alpha_k}}{b^k_{\alpha_k}}$$

Equation 20

After the value of the Gittins index GI is computed (e.g., at block 1015), sorted (e.g., at block 1020), and determined to be the largest kth value (e.g., at block 1025), the GI value (e.g., the largest kth GI value) is compared to a GI threshold value (e.g., 0.5 in this example) to determine the best completion rate for a time T, which is the stopping time. In this case, if the Gittin index GI is greater than the GI threshold value, a burst flag is set to on to call the load balancing agent 812 at block 1035.

FIGS. 11A-11C illustrate examples of an index policy filter for analyzing incoming traffic, according to example embodiments. While some non-limiting example waveforms of the incoming traffic are illustrated in FIGS. 11A-11C, the present disclosure is not limited to the examples shown in FIGS. 11A-11C, and the actual waveforms of the incoming traffic may differ from those shown. In some embodiments, after the monitoring procedure, the index policy filter 806 may mark the incoming traffic based on indexability to determine a proper spike value (e.g., burst value) of the incoming traffic. For example, in some embodiments, the index policy filter 806 analyzes incoming traffic of various distributions for bursts using the Gittins indices. The Gittins index provides a linear scale to represent the maximum value considered for a burst.

For example, in some embodiments, the index policy filter 806 may include a Gittins Index (GI) analyzer 1105. In some embodiments, the GI analyzer 1105 computes the Gittins index for arrival groups in steps of a window, and may output a representative value (e.g., a burst value) corresponding to the spike value for the window. For example, as shown in FIG. 11A, the GI analyzer 1105 may analyze the incoming traffic to generate randomly changing spike values (e.g., Gittins index values or GI values). As shown in FIG. 11A, linear increase in traffic arrival with the highest burst (e.g., highest burst value) may be segregated. As shown in FIG. 11B, linearly increasing burst values may result in the GI analyzer 1105 outputting the highest value (e.g., the highest burst value) as the new spike value. As shown in FIG. 11C, increasing burst values with a different set of random values may result in the GI analyzer outputting the highest value (e.g., the highest burst value) as the new spike value.

Figure 12:
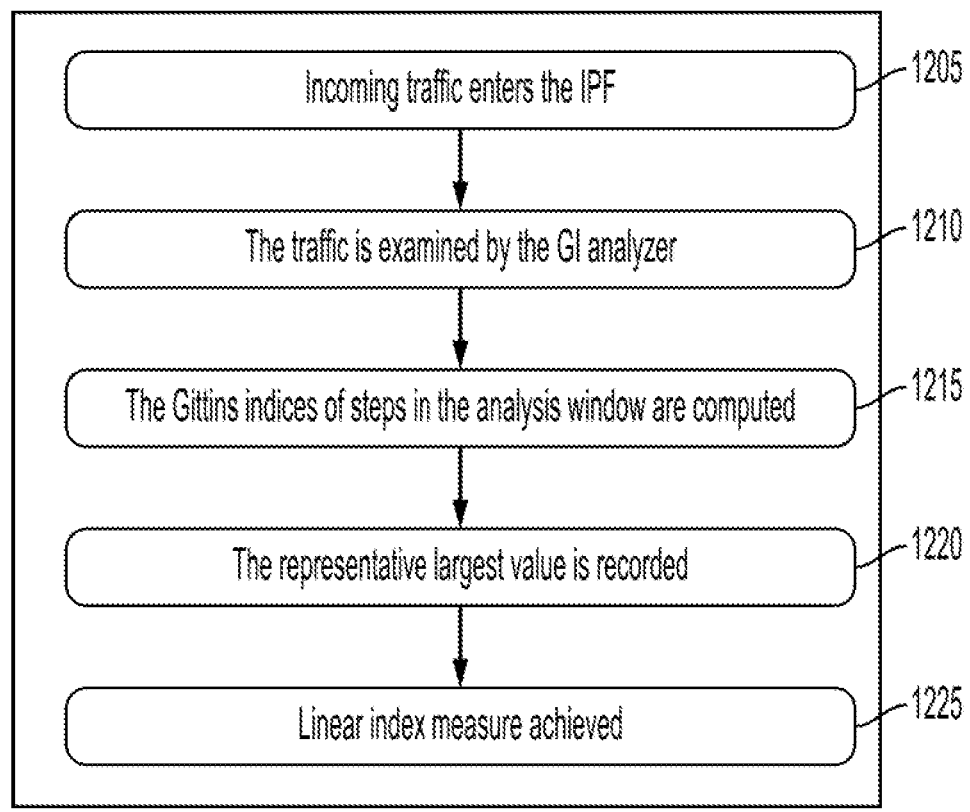
FIG. 12 is a flow diagram illustrating an example method for generating a burst value, according to an example embodiment.

FIG. 12 is a flow diagram illustrating an example method for generating a burst value, according to an example embodiment. Referring to FIG. 12, incoming traffic is received by the index policy filter 806 at block 1205. The incoming traffic is examined by the index policy filter 806 at block 1210. For example, in some embodiments, the index policy filter 806 may segregate the arrival groups into a plurality of steps of a window. The Gittins indices of each of the steps in the analysis window may be computed at block 1215. For example, the index policy filter 806 may calculate the Gittins index for each of the steps in the analysis window. The representative largest value may be recorded at block 1220. For example, the index policy filter 806 may identify and record the largest Gittins index from among the steps in the analysis window. The linear index measure is achieved at block 1225. For example, the recorded Gittins index provides a linear scale to represent the maximum value considered for a burst.

In some embodiments, once the detection phase is completed, the new spike values are used to produce new load requirements. For example, in some embodiments, the bound calculator 808 may calculate a bound calculation to determine a desired resource (e.g., from the resource pool) to be pooled in. In some embodiments, once the bound calculation is determined, all such future spike variations are trained and the load request may be satisfied. The bound calculator 808 will be described in more detail with reference to FIGS. 14 to 15B.

Hereinafter, aspects and features of the load balancing agent 812 for allocating resources in response to traffic conditions will be described in more detail. In some embodiments, the load balancing agent 812 may handle the parameters needed to make decisions on the nodes (e.g., VMs, containers, and/or the like) selected to satisfy the input load. Table 6 defines some symbols and their related descriptions of the algorithms used by the bound calculator 808 and the load balancing agent 812, according to some embodiments.

$$I' = \sqrt{\frac{2\ln N}{n_j}}$$ Equation 21

For example, when the load balancing agent 812 is called for an initial time (e.g., the first time), an initial expected $B_j$ plus the load managing value I is computed, such that a new updated value is defined as $Bj=Bj+I'$. This calculation is performed by exploring all resource availability and favoring the composition with the highest gain. This is referred to as the confidence bound of resource allocations, such that at all times, the learning process favors the actions with the highest confidence bounds. According to some embodiments, the learning process may include a reinforcement learning strategy also known as Q-learning. That is, in some embodiments, a mean reward that an agent (e.g., the load balancing agent 812) could get out from the environment (e.g., cloud environment) is demarcated. For example, in some embodiments, the load balancing agent 812 may approximate the expectation by using exponentially weighted moving average (EWMA). For example, in some embodiments, the load balancing agent 812 may iterate over the state-action cycle as shown in Equation 22, where S, S' indicates past and present states of GI measurements, respectively, a indicates different load values, and r defines an immediate reward parameter.

$$\hat{Q}(s,a):=r(s,a)+\gamma \max_{a_i} Q(s',a_i)$$ Equation 22:

Using EWMA, Equation 22 may be rewritten as shown in Equation 23.

$$\hat{Q}(s,a):=\alpha\hat{Q}(s,a)+(1-\alpha)Q(s,a)$$ Equation 23:

TABLE 6

| Symbol | Description |
| --- | --- |
| $I' = \sqrt{\dfrac{2\ln N}{n_j}}$ | Incremental load bounds calculated, allocations, load values |
| $B_j = B_j + I'$ | Base resource parameter, updated base resource parameter |
| $\max\sum_{i\in I}\sum_{j\in J}(x_j^e p_i^e - r_i^c b_j^c); \; \forall c \in C; \forall e \in E$ | Time to completely traverse stopping set S(a) T(S(a)) with t > 0: Xt \in S(a), discount parameter |
| $r_i^c = \begin{cases} 1, & \text{if the } VMc \text{ serves the burst } i \\ 0, & \text{otherwise} \end{cases}$ | Reward definition based on assigning a job to a node |
| $p_i^e = \begin{cases} 1, & \text{if for a burst } i \text{ that takes the extra resource } e \\ 0, & \text{otherwise} \end{cases}$ | Reward definition based on assigning a job to a node |
| $\hat{Q}(s, a) := r(s, a) + \lambda\max_{a_j} Q(s', a_j)$ | Q function for Gittins index measurement input state and load balancing action a, discount parameter and local maximum q value with current and next states modelling parameters |
| $\hat{Q}(s, a) := \alpha\hat{Q}(s, a) + (1 - \alpha)Q(s, a)$ | |

In some embodiments, as the degree of variability is very high, a base resource parameter $B_j$ may be determined that is subjected to be assigned to loads j before the peak detection. For example, from the time the burst began until a stopping time, a total of N allocations may be provided with $n_j$ referring to the incremental updates made for the assignments. This is given by an estimated incremental load managing value I', as defined in Equation 21.

Figure 13A:
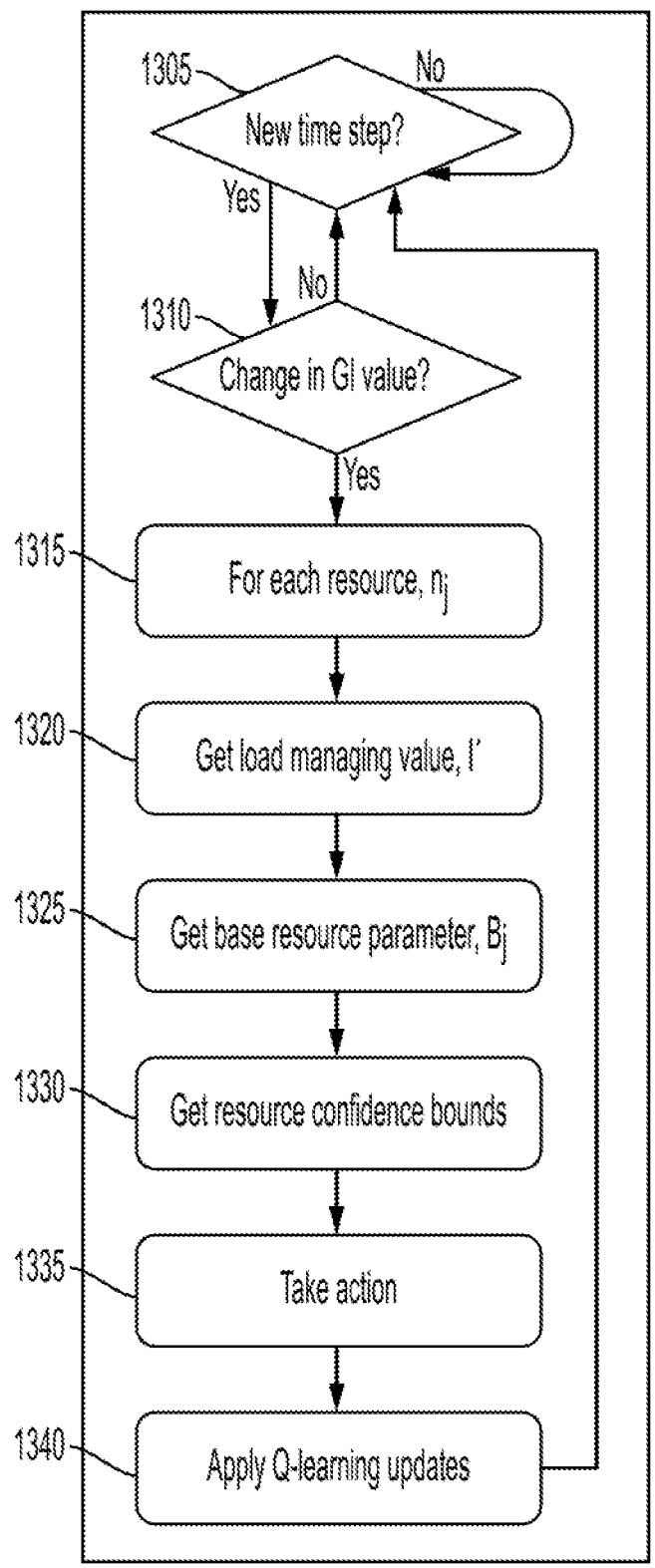
FIG. 13A is a flow diagram of an example method of a machine learning process, according to an example embodiment.

FIG. 13A is a flow diagram of an example method of a machine learning process, according to an example embodiment, and FIG. 13B is corresponding pseudocode for implementing the process of FIG. 13A.

In some embodiments, a new time step triggers the machine learning process at block 1305. For the new time step, a change in the Gittins index GI value is determined at block 1310. If there is no change in the Gittins index GI value at block 1310 (e.g., NO), then the process continues monitoring for a new time step at block 1305. On the other hand, if there is a change in the Gittins index GI value at block 1310, then for each resource $n_j$ at block 1315, a load managing value I' is determined at block 1320, a base resource parameter $B_j$ is determined at block 1325, and the confidence bounds for each of the resources $n_j$ is calculated at block 1330. The load balancing agent 812 takes an action at block 1335. For example, in some embodiments, the load balancing agent 812 selects the action with the highest confidence bound. Finally, any Q-learning updates learned from the selected action taken are applied at block 1340.

For example, in some embodiments, the objective of the load balancing agent 812 may be to maximize provider profit. As it is difficult to estimate the changing cloud environment conditions, it may be important to drive resource assignment through a learning process, as a single burst interval does not demarcate a successful all-in-one training. Accordingly, in some embodiments, the Q-learning strategy is used as shown in Equation 24.

$$\max \sum_{i \in I} \sum_{j \in J} (x_j^e p_i^e - r_i^c b_j^c); \forall c \in C; \forall e \in E \quad \text{Equation 24}$$

Where $r_i^c$ is defined by Equation 25.

$$r_i^c = \begin{cases} 1, & \text{if the VM } c \text{ serves the burst } i \\ 0, & \text{otherwise} \end{cases} \quad \text{Equation 25}$$

A binary variable $p_i^e$ is defined by Equation 26.

$$p_i^e = \begin{cases} 1, & \text{if for a burst } i \text{ that takes the extra resource } e \\ 0, & \text{otherwise} \end{cases} \quad \text{Equation 26}$$

In the above Equations 24 to 26, the variable e is defined as any event that is aligned with changing burst values GI.

In order to directly execute the load balancing agent's 812 action on the resource pool (e.g., node pool or VM pool), control is passed to the composition logic 810 and the resource pool scheduler 814. In some embodiments, the composition logic 810 includes logic to add and remove resources, as composing resources may be an integral part of a dynamic virtual environment. Accordingly, in some embodiments, the composition logic 810 may adjust the resource requirements based on the spike value (or burst value) calculation. Once an initial detection has arrived, the overall requirement may be computed based on which resource (e.g., a Virtual Machine) is chosen from the resource pool (e.g., a VM Pool). In some embodiments, the composition logic 810 may re-compose the resources (e.g., the VMs) with the initial virtual network, thereby producing a new virtual compute environment.

In some embodiments, the resource pool scheduler 814 may allocate a table of jobs into the appropriate queue, and may perform the dispatch. As the dispatcher, the resource pool scheduler 814 feeds a part of the new virtual compute environment schedule to the index policy filter 806 to complete the feed-back loop of learning and exploring. In some embodiments, once the new schedule is prepared, all new arrivals having a similar Gittins index value to the previous ones may remain self-satisfied.

In some embodiments, as the load balancing agent 812 explores its possible actions, it avoids disadvantageous actions experienced in prior similar situations. In other words, in some embodiments, the load balancing agent 812 highlights actions that it is optimistic about based on the confidence bounds calculated by the bound calculator 808. For example, in some embodiments, the bound calculator 808 evaluates the confidence bound of how well the load balancing agent 812 considers requests are satisfied. In some embodiments, the bound calculator 808 takes the output of the index policy filter 806 as a spike requirement basis for calculating load parameters, for example, to compute the incremental load value I'.

Figure 14:
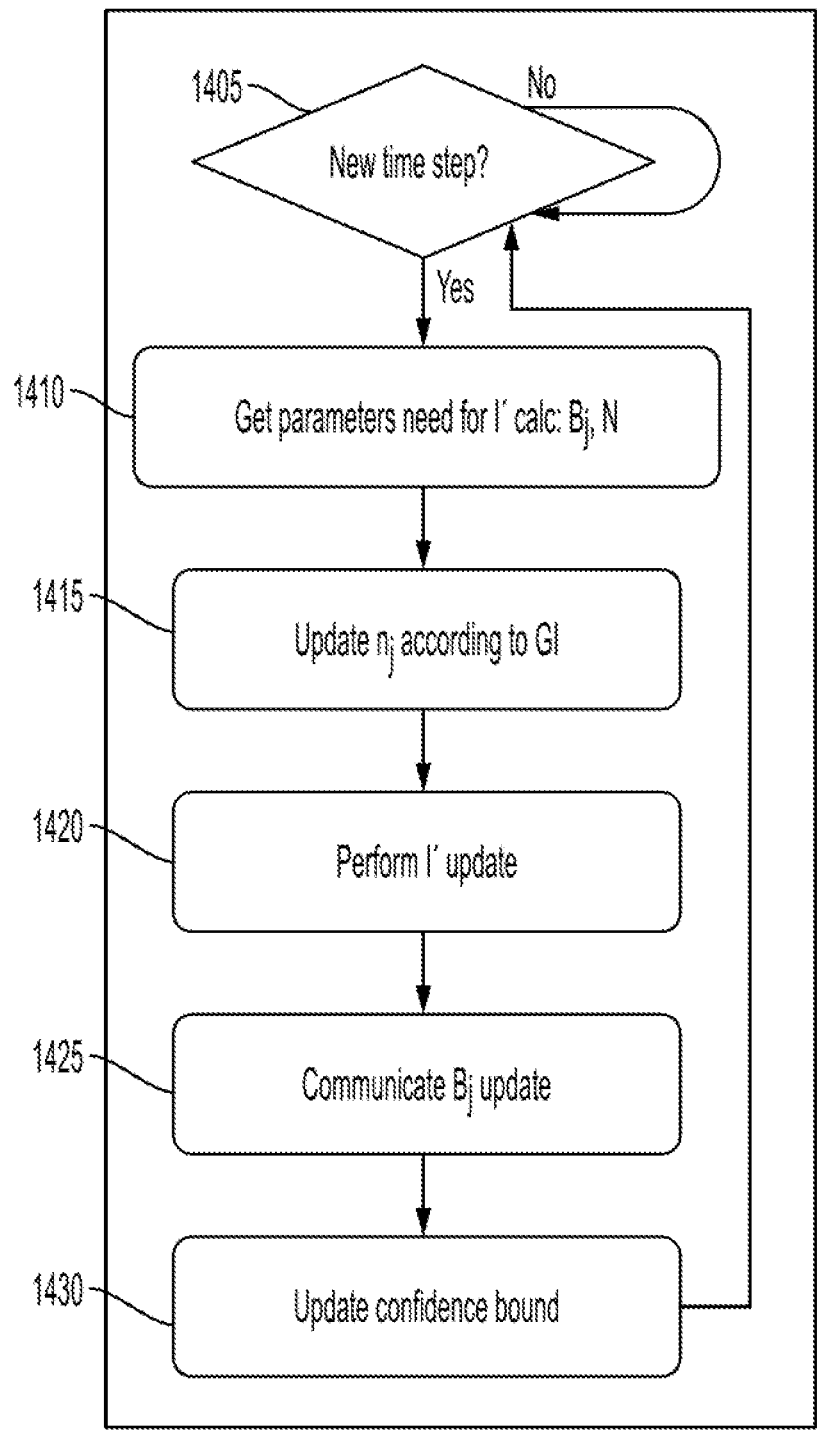
FIG. 14 is a flow diagram of a bound calculator, according to an example embodiment.

For example, FIG. 14 is a flow diagram of the bound calculator, according to an example embodiment. Referring to FIG. 14, in some embodiments, the $B_j$ (B_j) and I' parameters may be acquired to calculate the $n_j$ (n_j) parameter in order to influence the Q-learning process of the load balancing agent 812. For example, for a new time step at block 1405, the parameters used (e.g., $B_j$ and N) for calculating the incremental load managing value I' is obtained at block 1410. An updated $n_j$ parameter is obtained according to the Gittins index GI at block 1415. The incremental load managing value I' is updated at block 1420, and the $B_j$ update is communicated at block 1425. The confidence bound is then updated at block 1430.

Figure 15A:
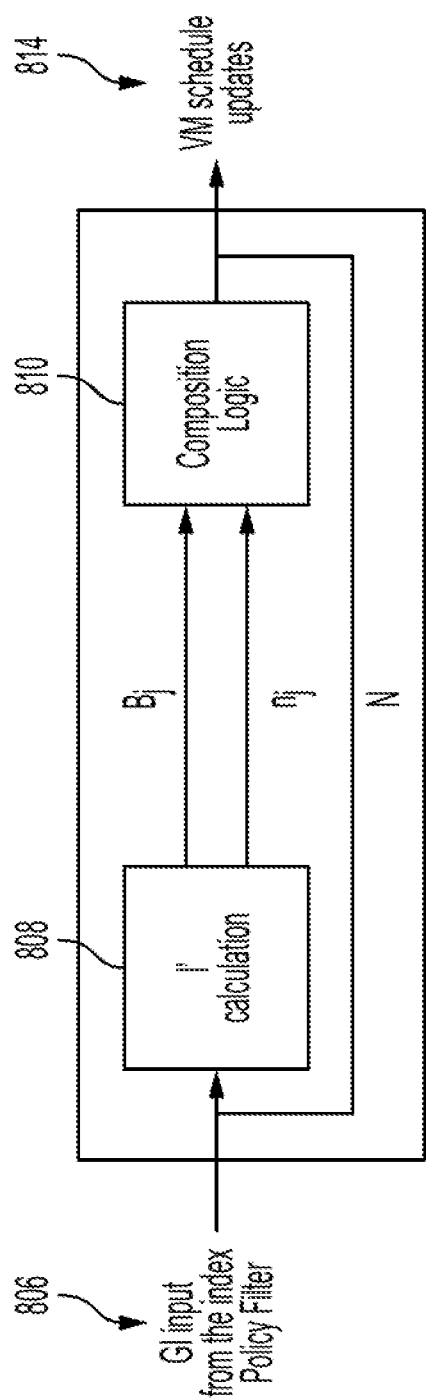
FIG. 15A illustrates parameter transmission between an index policy filter, a bound calculator, composition logic, and a resource pool scheduler, according to an example embodiment.
Figure 15B:
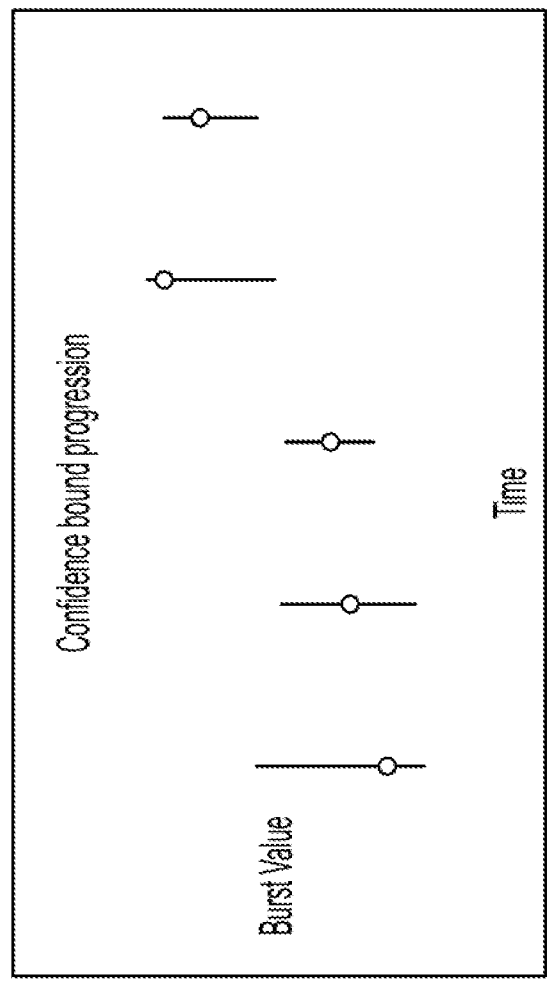
FIG. 15B shows the resulting confidence bound levels of a load balancing agent, according to an example embodiment.

FIG. 15A illustrates parameter transmission between the index policy filter 806, the bound calculator 808, the composition logic 810, and the resource pool scheduler 814, according to an example embodiment. FIG. 15B shows the resulting confidence bound levels of the load balancing agent 812, according to an example embodiment.

Figure 16:
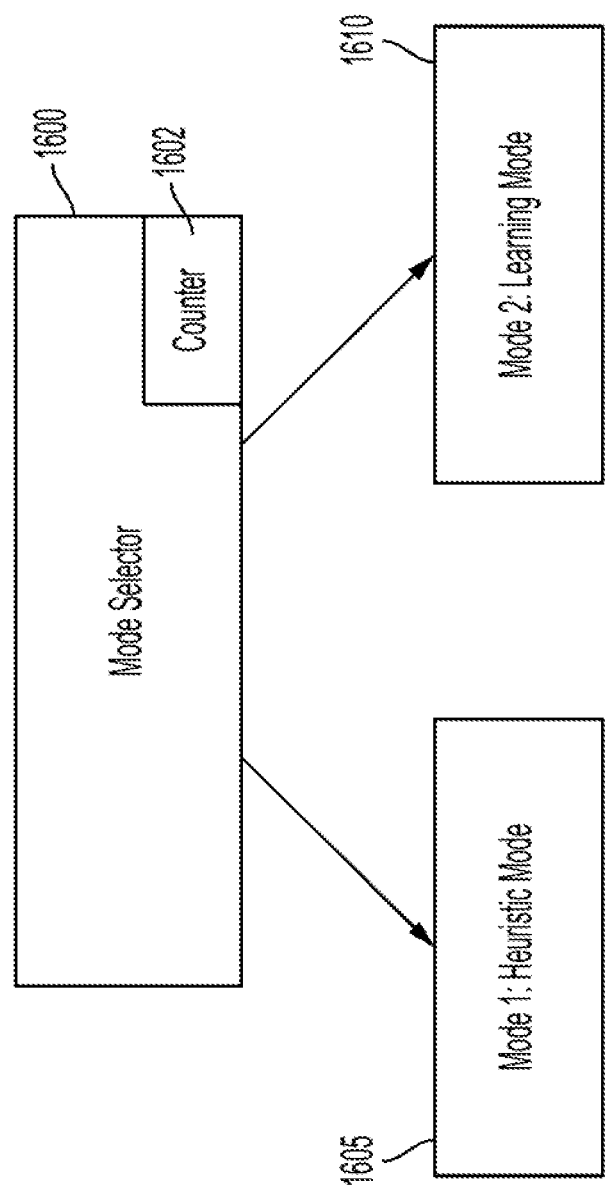
FIG. 16 is a block diagram of a mode selector, according to an example embodiment.
Figure 17:
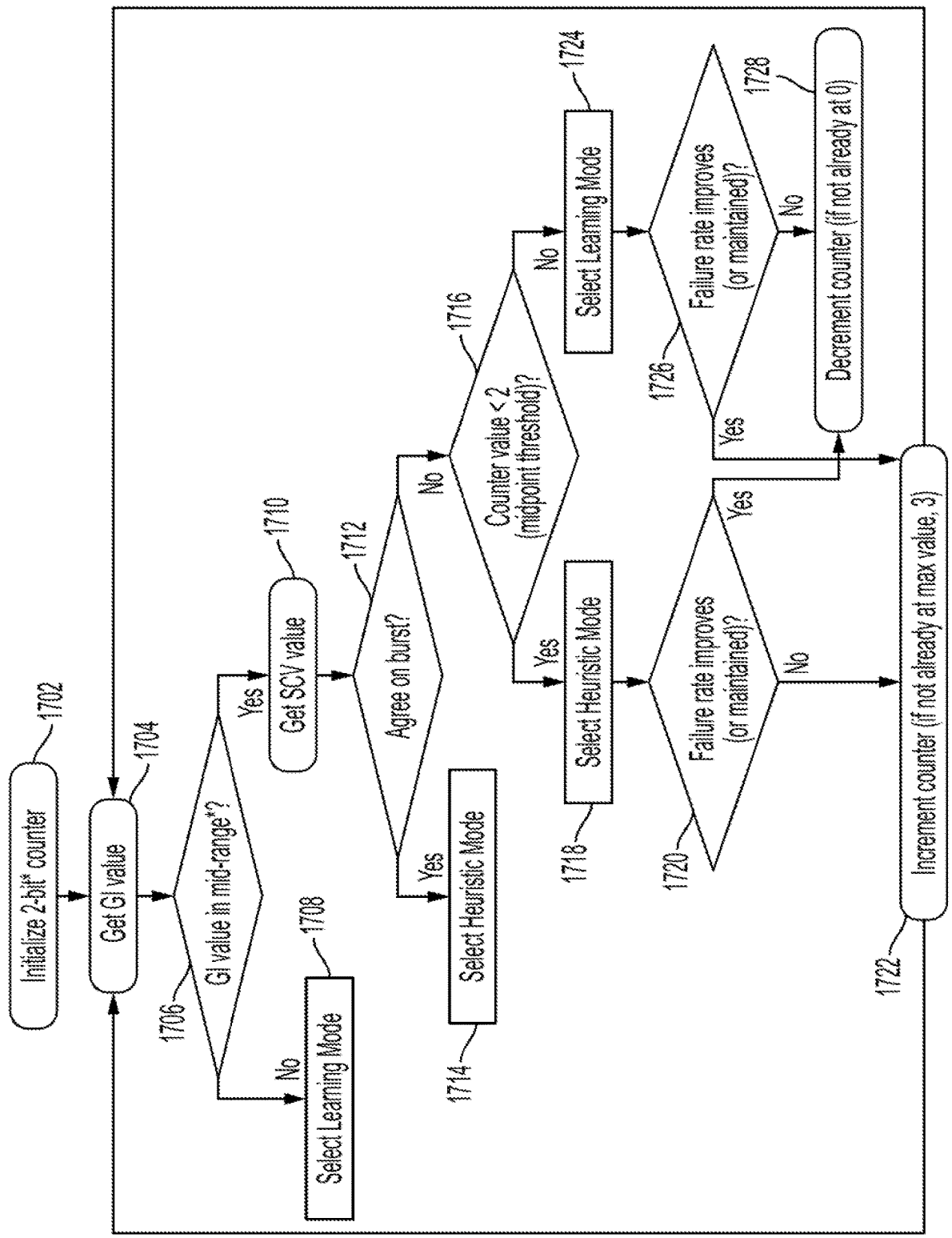
FIG. 17 is a flow diagram of a method for automatically selecting between a first mode and a second mode, according to an example embodiment.

FIG. 16 is a block diagram of a mode selector, according to an example embodiment. FIG. 17 is a flow diagram of a method for automatically selecting between a first mode and a second mode, according to an example embodiment. In various embodiments, a load balancing system is provided that may operate under either the first mode (e.g., the heuristic mode) or the second mode (e.g., the learning mode), as described above. For example, in some embodiments, the load balancing system may be configured to operate under either of the first mode or the second mode based on the desired aspects and features of each of the modes described above. In other embodiments, the system may automatically select between any of the first or second modes, to selectively operate under each of the first and second modes as needed or desired. For example, in some embodiments, the load balancing system may include a mode selector 1600 to automatically select between any of the first mode 1605 or the second mode 1610 as needed or desired.

In some embodiments, the mode selector 1600 may include a counter 1602 to select between the first and second modes. In some embodiments, the counter 1602 may be a 2-bit counter that is not allowed to overflow or underflow, but the present disclosure is not limited thereto. In some embodiments, the mode selector 1600 uses the counter 1602 to provide some resistance such that the system does not switch between modes too frequently. For example, persistent context switching may adversely affect the learning development of the load balancing agent 812. Accordingly, in some embodiments, the mode selector 1600 may use the counter 1602 to ensure that mode switching is performed after the load balancing agent 812 has been sufficiently trained by demonstrating high performance for a period of time.

In brief overview, in some embodiments, the mode selector 1600 uses the counter 1602 to determine whether to operate in the first mode (e.g., the heuristic mode) 1605 or the second mode (e.g., the learning mode) 1610. For example, in some embodiments, a higher counter value (e.g., above a middle counter value) may indicate a higher trust level on the second mode (e.g., the learning mode) 1610 (e.g., indicating that the load balancing agent 812 has been sufficiently trained), whereas a lower counter value (e.g., below the middle counter value) may indicate a higher trust level on the first mode (e.g., the heuristic mode) 1605. In some embodiments, however, mode selection may be concerned when traffic resembles a uniform distribution, that is, when the Gittins index value falls in a corresponding threshold range (e.g., a preset mid-range such as 0.5, for example). In some embodiments, if both modes agree on a burst scenario, then the mode selector 1600 selects the first mode 1605, which may be more lightweight when compared to the second mode 1610. On the other hand, in some embodiments, if the modes do not agree on the burst scenario, then the counter value may be used to select between the modes.

In more detail, referring to FIG. 17, the mode selector 1600 initiates the counter 1602 at block 1702. For example, the mode selector 1600 may set the counter 1602 to an initial counter value (e.g., 0) at block 1702. The Gittins index (GI) value may be retrieved at block 1704. In some embodiments, the mode selector 1600 may compare the GI value with a threshold range (e.g., a preset mid-range such as 0.5) to determine whether the GI value is within the threshold range at block 1706. If the GI value is not within the threshold range at block 1706 (e.g., NO), then the mode selector 1600 may select the second mode (e.g., the learning mode) at block 1708. On the other hand, if the GI value is within the threshold range at block 1706 (e.g., YES), then the mode selector 1600 may retrieve the SCV value at block 1710.

At block 1712, the mode selector 1600 may determine whether the first and second modes agree on a burst scenario. If both the first and second modes agree on a burst scenario at block 1712 (e.g., YES), then the mode selector 1600 may select the first mode (e.g., the heuristic mode) at block 1714. On the other hand, if the first and second modes do not agree on a burst scenario at block 1712 (e.g., NO), then the counter value of the counter 1602 is compared with a counter threshold value (e.g., the mid-point counter value of 2 in this example) to determine whether the counter value is less than the counter threshold value. If the counter value is less than the counter threshold value at block 1716 (e.g., YES), then the first mode is selected at block 1718. The mode selector 1600 then determines whether the failure rate improves (or is maintained) at block 1720 under the first mode. If the failure rate does not improve (or is maintained) at block 1720 (e.g., NO), then the counter 1602 is incremented at block 1722 (e.g., if not already at a maximum value of 3 in this example of a 2-bit counter). If the failure rate improves at block 1720, then the counter 1602 is decremented at block 1728 (e.g., if not already at a minimum value of 0 in this example).

On the other hand, if the counter value is greater than the counter threshold value at block 1716 (e.g., NO), then the mode selector 1600 may select the second mode at block 1724. The mode selector 1600 then determines whether the failure rate improves (or is maintained) at block 1726 under the second mode. If the failure rate does not improve (or is maintained) at block 1726 (e.g., NO), then the counter 1602 is decremented at block 1728 (e.g., if not already at a minimum value of 0 in this example). On the other hand, if the failure rate improves at block 1726, then the counter 1602 is incremented at block 1722 (e.g., if not already at a maximum value of 3 in this example of a 2-bit counter).

Some or all of the operations described herein may be performed by one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of systems and methods for spike detection and intelligent load balancing have been specifically described and illustrated herein, many modifications and variations will be apparent to those skilled in the art. Accordingly, it is to be understood that systems and methods for spike detection and intelligent load balancing constructed according to principles of this disclosure may be embodied other than as specifically described herein. The invention is also defined in the following claims, and equivalents thereof.

What is claimed is:

1. A load balancing system, comprising:
   a centralized queue;
   a pool of resource nodes coupled to the centralized queue;
   one or more processors; and
   memory coupled to the one or more processors and storing instructions that, when executed by the one or more processors, cause the one or more processors to:
   monitor a queue status of the centralized queue to identify a first traffic period;
   calculate an index value for a load associated with the first traffic period;
   select a load balancing strategy based on the index value;
   distribute the load to the pool of resource nodes based on the load balancing strategy;
   observe a state of the pool of resource nodes in response to the load balancing strategy;
   calculate a reward based on the observed state, the index value, and the selected load balancing strategy according to a reward function; and
   adjust the load balancing strategy based on the reward.

2. The system of claim 1, wherein the index value corresponds to a Gittins Index (GI) value.

3. The system of claim 2, wherein to calculate the index value, the instructions further cause the one or more processors to:
   calculate a plurality of GI values for the load associated with the first traffic period; and
   output a greatest one of the plurality of GI values as a new spike value.

4. The system of claim 3, wherein to distribute the load to the pool of resource nodes, the instructions further cause the one or more processors to:
   adjust resource requirements for the pool of resource nodes based on the new spike value to generate a new compute environment; and
   generate a schedule of job request distributions associated with the load for the new compute environment.

5. The system of claim 1, wherein to select the load balancing strategy, the instructions further cause the one or more processors to:
   calculate an incremental load managing value for each resource in the pool of resource nodes; and
   calculate a base resource parameter for each resource in the pool of resource nodes.

6. The system of claim 5, wherein the load balancing strategy is selected based on the resource with the greatest base resource parameter.

7. The system of claim 1, wherein to calculate the reward, the instructions further cause the one or more processors to:
   calculate a Q-function based on the index value, an input state, the selected load balancing strategy, and a reward parameter.

8. The system of claim 7, wherein the Q-function is calculated according to: $\hat{Q}(s,a):=r(s,a)+\gamma \max_{a_i} Q(s',a_i)$,
   wherein:
   s and s' corresponds to past and present state GI index values, respectively,
   a corresponds to different load values; and
   r corresponds to an immediate reward parameter.

9. The system of claim 7, wherein the instructions further cause the one or more processors to:
   apply an exponentially weighted moving average to the Q-function calculation.

10. The system of claim 1, wherein the load corresponds to a Poisson traffic distribution.

11. A method for load balancing, the method comprising:
    monitoring, by one or more processors, a queue status of a centralized queue to identify a first traffic period;
    calculating, by the one or more processors, an index value for a load associated with the first traffic period;
    selecting, by the one or more processors, a load balancing strategy based on the index value;
    distributing, by the one or more processors, the load to a pool of resource nodes based on the load balancing strategy;
    observing, by the one or more processors, a state of the pool of resource nodes in response to the load balancing strategy;
    calculating, by the one or more processors, a reward based on the observed state, the index value, and the selected load balancing strategy according to a reward function; and
    adjusting, by the one or more processors, the load balancing strategy based on the reward.

12. The method of claim 11, wherein the index value corresponds to a Gittins Index (GI) value.

13. The method of claim 12, wherein the calculating of the index value comprises:
- calculating, by the one or more processors, a plurality of GI values for the load associated with the first traffic period; and
- outputting, by the one or more processors, a greatest one of the plurality of GI values as a new spike value.

14. The method of claim 13, wherein the distributing of the load to the pool of resource nodes comprises:
- adjusting, by the one or more processors, resource requirements for the pool of resource nodes based on the new spike value to generate a new compute environment; and
- generating, by the one or more processors, a schedule of job request distributions associated with the load for the new compute environment.

15. The method of claim 11, wherein the selecting of the load balancing strategy comprises:
- calculating, by the one or more processors, an incremental load managing value for each resource in the pool of resource nodes; and
- calculating, by the one or more processors, a base resource parameter for each resource in the pool of resource nodes.

16. The method of claim 15, wherein the load balancing strategy is selected based on the resource with the greatest base resource parameter.

17. The method of claim 11, wherein the calculating of the reward comprises:
- calculating, by the one or more processors, a Q-function based on the index value, an input state, the selected load balancing strategy, and a reward parameter.

18. The method of claim 17, wherein the Q-function is calculated according to: $\hat{Q}(s,a) := r(s,a) + \gamma \max_{a_i} Q(s', a_i)$,
wherein:
- s and s' corresponds to past and present state GI index values, respectively,
- a corresponds to different load values; and
- r corresponds to an immediate reward parameter.

19. The method of claim 17, further comprising:
- applying, by the one or more processors, an exponentially weighted moving average to the Q-function calculation.

20. The method of claim 11, wherein the load corresponds to a Poisson traffic distribution.

* * * * *